US009092637B2

United States Patent
Mathew et al.

(10) Patent No.: US 9,092,637 B2
(45) Date of Patent: *Jul. 28, 2015

(54) PROFILE AND CONSENT ACCRUAL

(71) Applicant: Microsoft Corporation, Redmond, WA (US)

(72) Inventors: Ashvin Joseph Mathew, Kirkland, WA (US); Puhazholi Vetrivel, Redmond, WA (US); Nayana Ramdas Mutha, Redmond, WA (US); Joseph Nicholas Coco, Bellevue, WA (US); Melissa W. Dunn, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,127

(22) Filed: Apr. 29, 2014

(65) Prior Publication Data

US 2014/0237616 A1 Aug. 21, 2014

Related U.S. Application Data

(63) Continuation of application No. 12/540,853, filed on Aug. 13, 2009, now Pat. No. 8,719,366, which is a continuation of application No. 10/784,530, filed on Feb. 23, 2004, now Pat. No. 7,590,705.

(51) Int. Cl.
*G06F 15/16* (2006.01)
*G06F 21/62* (2013.01)
*G06Q 30/02* (2012.01)

(52) U.S. Cl.
CPC .............. *G06F 21/62* (2013.01); *G06Q 30/02* (2013.01)

(58) Field of Classification Search
CPC .............................. G06F 21/60; G06F 21/602
USPC .......................................................... 726/30
See application file for complete search history.

(56) References Cited

U.S. PATENT DOCUMENTS

| 5,163,147 A | 11/1992 | Orita |
| 5,414,852 A | 5/1995 | Kramer et al. |
| 5,544,322 A | 8/1996 | Cheng et al. |

(Continued)

OTHER PUBLICATIONS

Basu et al., "Authentication in E-Commerce," Communications of the ACM, Dec. 2003, pp. 159-166, vol. 46, Issue 12, ACM Press, New York, U.S.A.

(Continued)

*Primary Examiner* — Douglas Blair
(74) *Attorney, Agent, or Firm* — Timothy Churna; Kate Drakos; Micky Minhas

(57) ABSTRACT

Consent management between a client and a network server. In response to a request for consent, a central server determines if requested user information is included in a user profile associated with a user and if the user has granted consent to share the requested user information. A user interface is provided to the user via a browser of the client to collect the requested user information that is not included in the user profile and the consent to share the requested user information from the user. After receiving the user information provided by the user via the user interface, the service provided by the network server is allowed access to the received user information, and the central server updates the user profile. Other aspects of the invention are directed to computer-readable media for use with profile and consent accrual.

23 Claims, 16 Drawing Sheets

(56) References Cited

U.S. PATENT DOCUMENTS

| | | | |
|---|---|---|---|
| 5,708,780 A | 1/1998 | Levergood et al. | |
| 5,889,952 A | 3/1999 | Hunnicutt et al. | |
| 5,941,947 A | 8/1999 | Brown et al. | |
| 5,995,972 A | 11/1999 | Allgeier | |
| 5,999,711 A | 12/1999 | Misra et al. | |
| 6,064,666 A | 5/2000 | Willner et al. | |
| 6,070,243 A | 5/2000 | See et al. | |
| 6,178,511 B1 | 1/2001 | Cohen et al. | |
| 6,253,203 B1 | 6/2001 | O'Flaherty et al. | |
| 6,260,148 B1 | 7/2001 | Aggarwal et al. | |
| 6,269,369 B1 | 7/2001 | Robertson | |
| 6,275,824 B1 | 8/2001 | O'Flaherty et al. | |
| 6,275,944 B1 | 8/2001 | Kao et al. | |
| 6,308,173 B1 | 10/2001 | Glasser et al. | |
| 6,381,579 B1 | 4/2002 | Gervais et al. | |
| 6,408,336 B1 | 6/2002 | Schneider et al. | |
| 6,463,533 B1 | 10/2002 | Calamera et al. | |
| 6,466,932 B1 | 10/2002 | Dennis et al. | |
| 6,480,850 B1 | 11/2002 | Veldhuisen | |
| 6,482,752 B1 | 11/2002 | Yamazaki et al. | |
| 6,496,855 B1 | 12/2002 | Hunt et al. | |
| 6,526,513 B1 | 2/2003 | Shrader et al. | |
| 6,571,279 B1 | 5/2003 | Herz et al. | |
| 6,584,505 B1 | 6/2003 | Howard et al. | |
| 6,631,361 B1 | 10/2003 | O'Flaherty et al. | |
| 6,651,217 B1 | 11/2003 | Kennedy et al. | |
| 6,678,731 B1 | 1/2004 | Howard et al. | |
| 6,708,276 B1 | 3/2004 | Yarsa et al. | |
| 6,741,989 B1 | 5/2004 | Seltzer et al. | |
| 6,820,204 B1 | 11/2004 | Desai et al. | |
| 6,850,943 B2 | 2/2005 | Teixeira et al. | |
| 6,859,212 B2 * | 2/2005 | Kumar et al. | 715/744 |
| 6,904,417 B2 | 6/2005 | Clayton et al. | |
| 6,956,942 B2 | 10/2005 | McKinzie et al. | |
| 6,985,955 B2 | 1/2006 | Gullotta et al. | |
| 7,072,886 B2 | 7/2006 | Salmenkaita et al. | |
| 7,124,302 B2 | 10/2006 | Ginter et al. | |
| 7,155,739 B2 | 12/2006 | Bari et al. | |
| 7,188,252 B1 | 3/2007 | Dunn | |
| 7,197,475 B1 | 3/2007 | Lorenzen et al. | |
| 7,240,192 B1 | 7/2007 | Paya et al. | |
| 7,260,838 B2 | 8/2007 | Bones et al. | |
| 7,334,013 B1 | 2/2008 | Calinov et al. | |
| 7,340,438 B2 | 3/2008 | Nordman et al. | |
| 7,428,750 B1 | 9/2008 | Dunn et al. | |
| 7,478,157 B2 | 1/2009 | Bohrer et al. | |
| 7,490,135 B2 | 2/2009 | Klug et al. | |
| 7,590,705 B2 | 9/2009 | Mathew et al. | |
| 7,730,092 B2 | 6/2010 | Lawson et al. | |
| 7,848,976 B2 * | 12/2010 | Juarez et al. | 705/35 |
| 7,908,208 B2 * | 3/2011 | Juarez et al. | 705/38 |
| 7,912,971 B1 | 3/2011 | Dunn | |
| 8,719,366 B2 | 5/2014 | Mathew et al. | |
| 2001/0023421 A1 | 9/2001 | Numao et al. | |
| 2001/0042126 A1 | 11/2001 | Wong et al. | |
| 2001/0049620 A1 | 12/2001 | Blasko | |
| 2002/0004909 A1 | 1/2002 | Hirano et al. | |
| 2002/0019828 A1 | 2/2002 | Mortl | |
| 2002/0023059 A1 | 2/2002 | Bari et al. | |
| 2002/0026345 A1 | 2/2002 | Juels | |
| 2002/0049907 A1 * | 4/2002 | Woods et al. | 713/182 |
| 2002/0091639 A1 | 7/2002 | Mandahl et al. | |
| 2002/0095571 A1 | 7/2002 | Bradee | |
| 2002/0099671 A1 | 7/2002 | Mastin Crosbie et al. | |
| 2002/0104015 A1 | 8/2002 | Barzilai et al. | |
| 2002/0112171 A1 | 8/2002 | Ginter et al. | |
| 2002/0120866 A1 | 8/2002 | Mitchell et al. | |
| 2002/0129221 A1 | 9/2002 | Borgia et al. | |
| 2002/0138572 A1 | 9/2002 | Delany et al. | |
| 2002/0184496 A1 | 12/2002 | Mitchell et al. | |
| 2002/0184507 A1 | 12/2002 | Makower et al. | |
| 2002/0188572 A1 | 12/2002 | Bleizeffer et al. | |
| 2003/0023451 A1 | 1/2003 | Willner et al. | |
| 2003/0041154 A1 | 2/2003 | Tran | |
| 2003/0046576 A1 | 3/2003 | High, Jr. et al. | |
| 2003/0081791 A1 | 5/2003 | Erickson et al. | |
| 2003/0088520 A1 | 5/2003 | Bohrer et al. | |
| 2003/0097451 A1 | 5/2003 | Bjorksten et al. | |
| 2003/0163438 A1 | 8/2003 | Barnett et al. | |
| 2003/0191703 A1 | 10/2003 | Chen et al. | |
| 2003/0196094 A1 | 10/2003 | Hillis et al. | |
| 2003/0217288 A1 | 11/2003 | Guo et al. | |
| 2004/0002878 A1 | 1/2004 | Hinton | |
| 2004/0003072 A1 | 1/2004 | Mathew et al. | |
| 2004/0010603 A1 | 1/2004 | Foster et al. | |
| 2004/0044628 A1 | 3/2004 | Mathew et al. | |
| 2004/0054918 A1 | 3/2004 | Duri et al. | |
| 2004/0054919 A1 | 3/2004 | Duri et al. | |
| 2004/0083243 A1 | 4/2004 | Feng et al. | |
| 2004/0088579 A1 | 5/2004 | Powers et al. | |
| 2004/0133454 A1 | 7/2004 | Desio | |
| 2004/0186901 A1 * | 9/2004 | Guigui | 709/217 |
| 2005/0076233 A1 | 4/2005 | Aarts et al. | |
| 2005/0131830 A1 | 6/2005 | Juarez et al. | |
| 2005/0240622 A1 | 10/2005 | Cheung | |
| 2007/0021980 A1 | 1/2007 | Holden | |
| 2007/0214144 A1 | 9/2007 | Lawson et al. | |
| 2009/0300509 A1 | 12/2009 | Mathew et al. | |
| 2010/0205065 A1 * | 8/2010 | Kumar et al. | 705/26 |
| 2010/0257094 A1 * | 10/2010 | Kumar et al. | 705/40 |
| 2011/0119203 A1 * | 5/2011 | Juarez et al. | 705/36 R |
| 2011/0289011 A1 * | 11/2011 | Hull et al. | 705/319 |
| 2011/0289153 A1 * | 11/2011 | Hull et al. | 709/205 |
| 2011/0289574 A1 * | 11/2011 | Hull et al. | 726/7 |

OTHER PUBLICATIONS

Bodnar et al., "Windows 2000 Deployment Overview at the University of Colorado at Boulder", 2000, ACM, pp. 8-13.

Damiani et al., Fine Grained Access Control for SOAP E-Services, WWW10, May 1-5, 2001, pp. 504-513 (ACM Press—ISBN 1-58113-348).

Grover et al., "E-Commerce and the Information Market," Communications of the ACM, Apr. 2001, pp. 79-86, vol. 44, Issue 4, ACM Press, New York, U.S.A.

Judy et al., "Windows 2000 Deployment Technical Challenges at the University of Colorado at Boulder", 2000, ACM, pp. 141-145.

Nguyen et al., "NT/Windows 2000 User Profile Issues", 2001, ACM, pp. 120-122.

Nyanchama et al., The Role Graph Model and Conflict of Interest, ACM Transactions on Information and System Security, vol. 2, No. 1, Feb. 1999, pp. 3-33.

Pfitzmann et al., "Privacy in Browser-Based Attribute Exchange," Proceedings of the ACM Workshop on Privacy in the Electronic Society, Nov. 2002, pp. 52-62, ACM Press, New York, U.S.A.

Van den Akker et al., The YGuard Access Control Model: Set-Based Access Control, SACMAT'01, May 3-4, 2001, pp. 75-84 (ACM Press—ISBN 1-58113-350).

Liberty Architecture Overview Version 1.0 Published Jul. 11, 2002 by the Liberty Alliance Project http://xml.coverpages.org/liberty-architecture-overview-v1.0.pdf, 41 pages.

Liberty Authentication Context Specification Version 1.0 Published Jul. 11, 2002 by the Liberty Alliances Project http://sml.coverpages.org/liberty-architecture-authentication-context-v1.0.pdf, 35 pages.

Liberty Protocols and Schemas Specification Version 1.0 Published Jul. 11, 2002 by the Liberty Alliance Project http://xml.coverpages.org/liberty-architecture-protocols-schemas-v1.0.pdf, 27 pages.

Newton, "Newton's Telecom Dictionary," 19th Edition, CMP Books, Mar. 2003, 3 pages, U.S.A.

W3C—A P3P Preference Exchange Language 1.0 (APPEL 1.0)—W3C Working Draft Feb. 26, 2001, available at www.w3.org/TR/P3P-preferences.html, 50 pgs, by Lorrie Cranor, Marc Langheinrich, and Massimo Marchiori.

W3C Initiative—P3P and Privacy on the Web FAQ, available at www.w3.org/P3P/p3pfaq.html, Oct. 24, 2001, 11 pgs.

\* cited by examiner

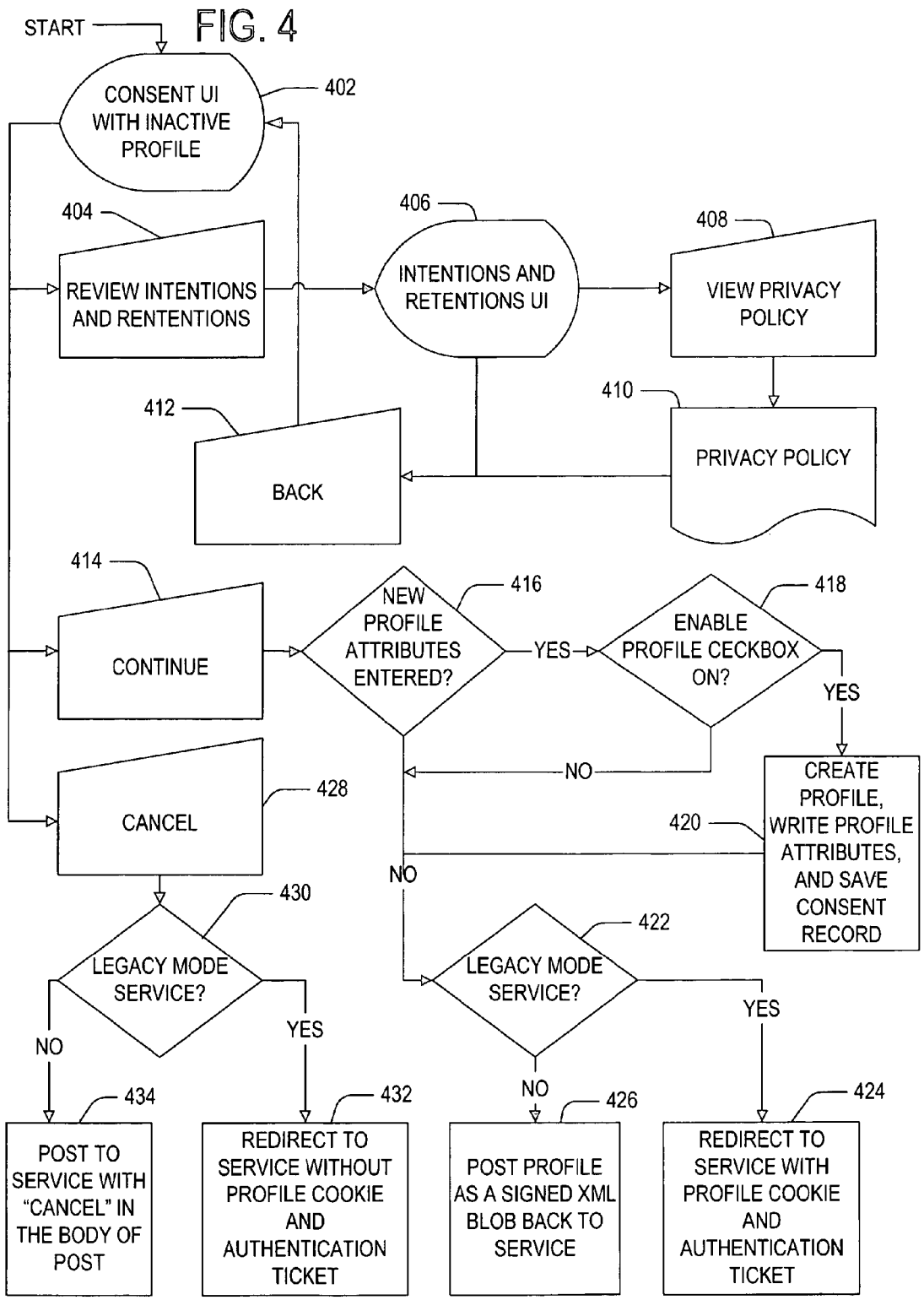

FIG. 7A

| SEE ALSO | SHARE PROFILE INFORMATION WITH SERVICE A |
|---|---|
| ⇑ PRIVACY POLICY<br>⇑ VIEW YOUR PER-SITE CONSENT SETTINGS<br>⇑ CHANGE YOUR PROFILE INFORMATION | BEFORE YOU SIGN IN, WE NEED YOUR CONSENT TO SHARE INFORMATION FROM YOUR USER PROFILE WITH SERVICE A. SERVICE A NEEDS THIS INFORMATION TO SHOW YOU LOCAL INFORMATION AND PERSONALIZED CONTENT. MEMBER SERVICES MAY ALSO USE THIS INFORMATION TO:<br>• BETTER MATCH ITS CONTENT AND SERVICES TO YOUR INTERESTS.<br>• INFORM OTHER SITES ABOUT YOU, AS STATED IN SERVICE A'S *PRIVACY POLICY*.<br>TO SIGN IN TO SERVICE A, YOU MUST CONSENT TO LET US SHARE THE INFORMATION THAT SERVICE A REQUIRES. WE WILL AUTOMATICALLY SHARE THIS INFORMATION EACH TIME YOU SIGN IN TO SERVICE A. IF YOU WANT TO SHARE ADDITIONAL INFORMATION, CLICK YES NEXT TO THE OPTIONAL ITEMS BELOW. WE AUTOMATICALLY SAVE ANY VIEW OR EDIT YOUR PROFILE BEFORE CONSENTING TO SHARE WITH SERVICE A. **WE AUTOMATICALLY SAVE ANY CHANGES YOU MAKE IN YOUR PROFILE AND IN YOUR *CONSENT HISTORY* FOR SERVICE A.** |
| | PERSONAL INFORMATION  FIRST NAME [MICHAEL]          *WILL BE SHARED*<br>                       LAST NAME  [         ]          *WILL BE SHARED*<br>                                                  SHARE?<br>                       GENDER    MALE ○  FEMALE ○   YES ○ NO ◉ |
| | CONTACT INFORMATION  CONTACT E-MAIL [         ]     *WILL BE SHARED* |
| | LOCATION INFORMATION ZIP CODE [         ]           *WILL BE SHARED*<br>                                                  SHARE?<br>                  COUNTRY/REGION [USA        ▽]  YES ○ NO ◉<br>                           STATE [WASHINGTON ▽]  YES ○ NO ◉ |
| | CLICK CONTINUE TO AGREE TO SHARE THIS INFORMATION WITH SERVICE A. SERVICE A MAY STORE YOUR INFORMATION INDEFINITELY. YOU CAN CHANGE OR DENY CONSENT TO LET US SHARE YOUR INFORMATION WITH SERVICE A BY VISITING MEMBER SERVICES AT A.COM. EDITING YOUR PROFILE, OR CHANGING OR DENYING CONSENT FOR US TO SHARE INFORMATION AT A LATER TIME DOES NOT REQUIRE SERVICE A TO SAVE YOUR CHANGES OR DELETE INFORMATION THAT YOU'VE ALREADY SHARED.<br><br>                                    [ CONTINUE ]   [ CANCEL ] |

YOU ARE SIGNED IN AS username@A.com    HELP | SIGN OUT

FIG. 7B

| | |
|---|---|
| HELLO, username@a.com<br>NOT YOU? SIGN IN WITH A DIFFERENT IDENTIFIER. | HELP |

EDIT THE PERSONAL PROFILE ASSOCIATED WITH
username@A.com

THIS PAGE CONTAINS ALL THE PERSONAL INFORMATION THAT YOU PROVIDED TO THE PERSONAL PROFILE SERVICE. WE ALWAYS ASK YOUR CONSENT BEFORE SHARING ANY PIECE OF THIS INFORMATION WHEN YOU VISIT ANY AFFILIATED SITE.

→ *VIEW OR CHANGE YOUR CONSENT HISTORY.*

YOU CAN CHANGE ANY OF THIS INFORMATION AS YOU WISH, BUT YOU DO HAVE TO CLICK THE "SAVE" BUTTON TO HAVE THE CHANGES COMMITTED TO THE PERSONAL PROFILE SERVICE.

| | |
|---|---|
| FIRST NAME | [ ] |
| LAST NAME | [ ] |
| LANGUAGE | [SELECT ONE ▽] |
| COUNTRY/REGION | [SELECT ONE ▽] |
| REGION/STATE | [SELECT ONE ▽] |
| POSTAL CODE/ZIP | [ ] |
| TIME ZONE | [SELECT ONE ▽] |
| TIME ZONE | [SELECT O ▽] [SELECT O ▽] [ ] FOR EXAMPLE, 1999 |
| GENDER | MALE ○ FEMALE ○ NOT SPECIFIED ⦿ |
| OCCUPATION | [SELECT ONE ▽] |

[CLEAR ALL]                                    [SAVE]  [CANCEL]

FIG. 7C

| | |
|---|---|
| HELLO, username@A.com<br>NOT YOU? SIGN IN WITH A DIFFERENT IDENTIFIER. | HELP |

SHARE PERSONAL INFORMATION WITH <AFFILIATE NAME>
<AFFILIATE NAME> NEEDS SOME INFORMATION FROM YOU SO THAT THEY CAN PROVIDE YOU WITH PERSONALIZED SERVICES.
YOU CAN ASK US TO ADD THE ITEMS MARKED WITH [→] TO YOUR USER PROFILE. (ADDING INFORMATION TO YOUR USER PROFILE CAN MAKE REGISTRATION AND SIGN-IN FASTER AT PARTICIPATING SITES.)

WHAT HAPPENS TO THE INFORMATION THAT I SHARE ?

NOTE IF YOU CLICK CANCEL, YOU MAY BE ABLE TO SIGN IN BUT YOU MAY BE UNABLE TO USE THE SITE'S SERVICES.

| | | |
|---|---|---|
| FIRST NAME | MICHAEL | |
| LAST NAME | [ ] | [→] |
| LANGUAGE | SELECT ONE ▽ | [→] |
| COUNTRY/REGION | USA | |
| REGION/STATE | WASHINGTON | |
| POSTAL CODE/ZIP | [ ] | [→] |
| TIME ZONE | PACIFIC | |
| DATE OF BIRTH | [ ] | [→] |
| GENDER | MALE ○ FEMALE ○ | [→] |
| OCCUPATION | SELECT ONE ▽ | [→] |
| ADD TO USER PROFILE | ☐ I WANT TO ADD THE ITEMS MARKED WITH [→] TO MY USER PROFILE. | |

[→] *I WANT TO VIEW OR CHANGE MORE ITEMS IN MY USER PROFILE.*

[CONTINUE] [CANCEL]

FIG. 7D

| HELLO, username@A.com<br>NOT YOU? SIGN IN WITH A DIFFERENT IDENTIFIER. | HELP |
|---|---|
| WHAT HAPPENS TO THE INFORMATION THAT I SHARE? | |

WHAT HAPPENS TO THE INFORMATION THAT YOU SHARE WITH SERVICE A?

SERVICE A MAY SAVE AND USE ITEMS FROM YOUR PROFILE AS SUMMARIZED BELOW. FOR MORE INFORMATION, PLEASE READ SERVICE A'S PRIVACY POLICY.

EMAIL ADDRESS
- TO CONTACT YOU IN ORDER TO NOTIFY YOU OF UPDATES TO THE SERVICE.

LOCATION
- PROVIDE TARGETED CONTENT AND ADVERTISING DURING YOUR CURRENT VISIT.
- COMPLETE THE TASK THAT YOU HAVE ASKED US TO DO.

DATE OF BIRTH
- TO HELP US UNDERSTAND WHAT OUR USERS SUCH AS YOU LIKE TO DO WHEN THEY USE OUR SERVICE.
- PROVIDE TARGETED CONTENT AND ADVERTISING DURING YOUR CURRENT VISIT.

HOW LONG CAN THEY KEEP IT?
- THE INFORMATION COLLECTED BY SERVICE A WILL BE RETAINED ACCORDING TO THE BUSINESS PRACTICES OF THE SITE. THE WEBSITE DOES NOT HAVE A DATA DESTRUCTION POLICY.

WHAT HAPPENS TO THE INFORMATION THAT YOU STORE IN YOUR PROFILE?
- PLEASE READ THE PRIVACY STATEMENT FOR DETAIL.

[BACK]

FIG. 7E

HELLO, username@A.com  
NOT YOU? SIGN IN WITH A DIFFERENT IDENTIFIER.  
HELP

REVIEW YOUR CONSENT

POLICY GROUP A
- → SEE THE INFORMATION YOU SHARED AND WHAT POLICY GROUP A WILL DO WITH IT.

- → REVOKE CONSENT

POLICY GROUP A CONSISTS OF

- SERVICE A
  - SERVICE B
  - SERVICE C

POLICY GROUP B
- → SEE THE INFORMATION YOU SHARED AND WHAT POLICY GROUP A WILL DO WITH IT.

- → REVOKE CONSENT

POLICY GROUP B CONSISTS OF

- SERVICE E
  - SERVICE F
  - SERVICE G

BACK

FIG. 7F

| HELLO, username@A.com<br>NOT YOU? SIGN IN WITH A DIFFERENT IDENTIFIER. | HELP |
|---|---|

REVOKE CONSENT TO THIS DATA

POLICY GROUP A CONSISTS OF

- SERVICE A
- SERVICE B
- SERVICE C

YOU WILL BE REVOKING CONSENT TO ALL THESE ELEMENTS.

EMAIL ADDRESS
- TO CONTACT YOU IN ORDER TO NOTIFY YOU OF UPDATES TO THE SERVICE.

LOCATION
- PROVIDE TARGETED CONTENT AND ADVERTISING DURING YOUR CURRENT VISIT.
- COMPLETE THE TASK THAT YOU HAVE ASKED US TO DO.

DATE OF BIRTH
- TO HELP US UNDERSTAND WHAT OUR USERS SUCH AS YOU LIKE TO DO WHEN THEY USE OUR SERVICE.
- PROVIDE TARGETED CONTENT AND ADVERTISING DURING YOUR CURRENT VISIT.

THIS WILL NOT DELETE DAT YOU ALREADY SHARED, IT WILL ONLY REVOKE ON-GOING ACCESS TO YOUR PROFILE. VISIT THE SITE TO SEE YOUR OTHER DATA.

[REVOKE]　[CANCEL]

FIG. 7G

HELLO, username@A.com  
NOT YOU? SIGN IN WITH A DIFFERENT IDENTIFIER.     HELP

NEED TO KNOW IF YOU ARE A KID

PLEASE PROVIDE THIS INFORMATION. IT WILL BE STORED IN YOUR PROFILE. WHY?

COUNTRY/REGION     SELECT ONE ▽

BIRTH DATE     SELECT ▽   SELECT ▽   [    ]
              FOR EXAMPLE, 1999

CONTINUE    CANCEL

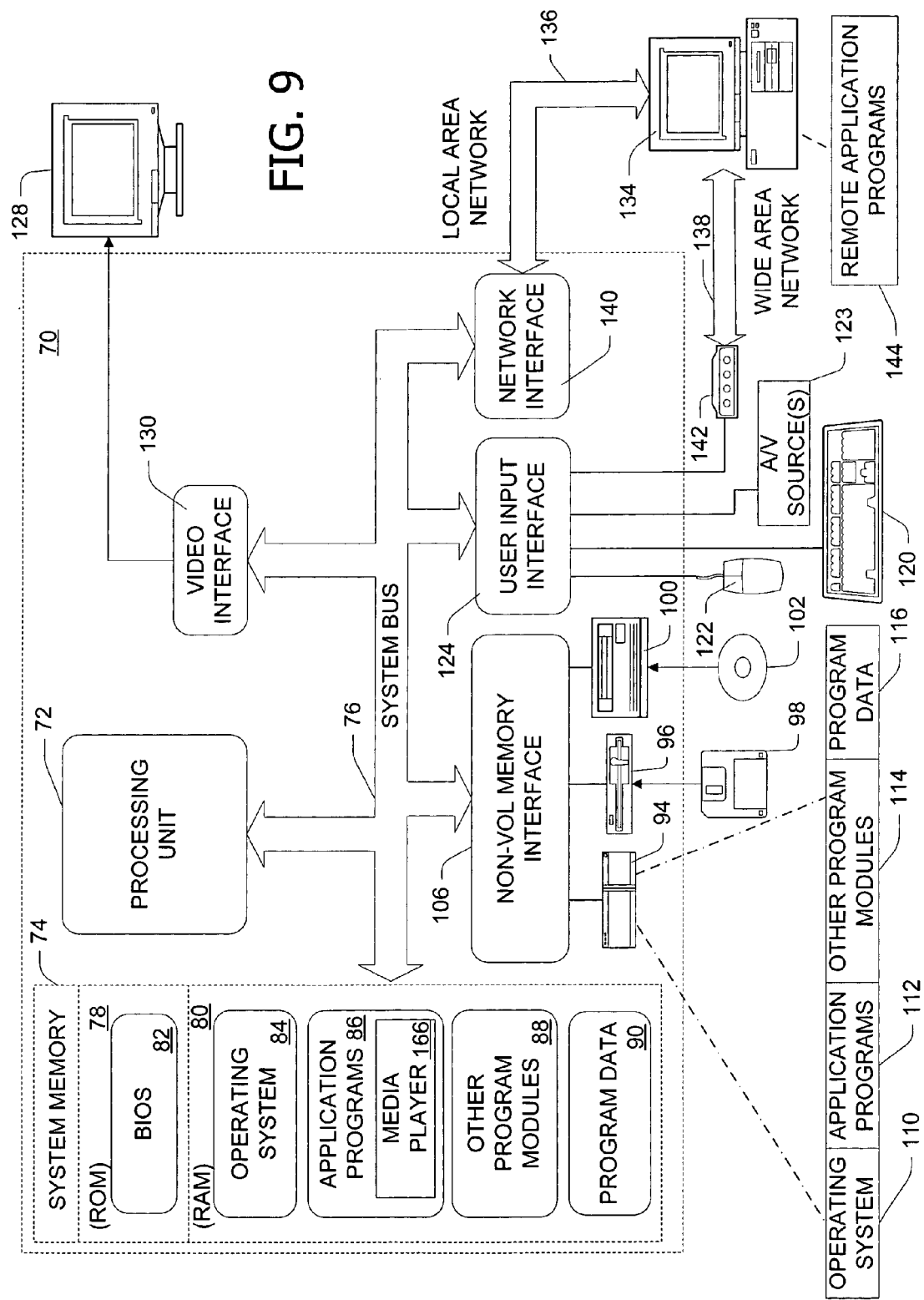

PROFILE AND CONSENT ACCRUAL

TECHNICAL FIELD

Embodiments of the present invention relate to the field of computer network environments. In particular, embodiments of this invention relate to easily accruing user information used by related applications or sites that are affiliated with a multi-site user authentication system.

BACKGROUND OF THE INVENTION

Web sites, or Internet sites, often provide information, products, services, and the like to their users. Many web sites desire users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site may request that the user select a login identifier, or login ID, and an associated password. The login ID allows the web site to identify the user and retrieve information about the user during subsequent user visits to the web site. Generally, the login ID is unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system, a web user can maintain a single login ID (and associated password) for accessing multiple, affiliated web servers or services. Such a system permits the user to establish a unique account identified by, for example, an e-mail address.

Large Internet service providers often have many different web sites through which they offer services to consumers. Moreover, a single web service can actually be made up of many different content providers. Other sites may be used to provide content related to children's interests, e-shopping, news, and so forth. Consumers usually perceive these related sites as being essentially the same service. Further, as Internet usage migrates to a subscription-based model that includes content and services from a variety of different sites, the need exists for accurately sharing common information (e.g., billing and subscription information) between related sites.

As described above, a web site often gathers personal information about its users for later use. A typical privacy statement for a web site describes how the site protects and uses personal information. The policy will likely specify first what information the site collects. For example, the site may maintain a profile for the user including information (attributes) such as the user's e-mail address, first and last name, country or region, state or territory, ZIP code or postal code, language preference, time zone, gender, birth date, occupation, telephone number(s), credit card information, billing and shipping addresses, password, PIN, secret question and secret answer, clothing sizes, music preferences, and the like. Inasmuch as this profile information can be quite sensitive, the typical policy also specifies how the information will or will not be used. For example, a web site's privacy policy may forbid the site from selling or renting a user's personal information without prior consent. The same policy, however, may detail a number of permitted uses (e.g., resolving customer support inquiries, performing statistical analyses of the site's services, conforming to legal requirements, protecting the personal safety of users or the public). A typical policy often specifies certain circumstances under which disclosures or uses of information are permitted and those other circumstances under which they are not.

Users typically do not like to provide too much information during a first time sign-up or registration. If asked to provide more information than needed for sign-up or registration, the users may provide inaccurate information in order to speed up the registration process. Such inaccurate user information undermines the purpose of having a profile store.

Furthermore, there has been an increasing movement in local, federal, and international governments to require web sites to provide consumers explicit notice and choice in order for the consumers to grant affirmative consent for the sites to use the obtained consumer information. Prior systems and methods do not effectively address such consent requirements.

Another disadvantage of the prior systems and methods is that there is no mechanism for web sites to collect the same information from users. In other words, web sites get differing amounts of information depending on which users access the web sites. As a result, web sites are forced to collect the missing user information manually or to limit the service features for users who have not provided the necessary information.

Accordingly, a solution is needed that allows accruing consent for an affiliated site or service to use obtained user information while complying with the various consent requirements.

SUMMARY OF THE INVENTION

Embodiments of the invention overcome one or more deficiencies in the prior art by providing, among other things, improved sharing of information among related sites. Information accrual may be deferred to the time when the users see the relevance of information collection according to embodiments of the invention. For example, a user is more likely to provide accurate information regarding a style of car desired when visiting a car-buying site than if asked for the same information during initial registration of an unrelated site. A user profile according to one embodiment of the invention effectively stores user-specific information that identifies a user with respect to one or more sites or services. When the user visits a particular site/service, the site/service may desire some information regarding the user. One embodiment of the present invention effectively determines if the desired information is stored in the user profile. If the desired information is not stored in the user profile, embodiments of the invention advantageously provide a user interface (UI) to accrue the desired information from the user. If the user grants consent for the site/service to use the accrued information, embodiments of the invention effectively provide the accrued information to the site/service. Embodiments of the invention also advantageously provide intention information, retention information, and privacy policy associated with a particular site/service for the user to decide whether to grant consent to share the desired information with the site/service. Moreover, the features of embodiments of the present invention described herein are less laborious and easier to implement than currently available techniques as well as being economically feasible and commercially practical.

Briefly described, a method employing aspects of the invention manages consent between a client and a network server. The client and the network server are coupled to a data communication network. The network server provides a service to a user via the client. And the client operates a browser configured to permit the user to communicate on the data communication network. The method includes maintaining a user profile associated with the user. The method also includes receiving a request from the service provided by the network server for user information associated with the user and for consent to use the requested user information. In response to the request for consent, the method includes determining if the requested user information is included in the user profile. The method also includes providing a user interface via the browser to collect the requested user information that is not included in the user profile from the user. The method further includes receiving the user information provided by the user via the user interface. The method further includes allowing access by the service to the received user information.

In another embodiment of the invention, an authentication system employing aspects of the invention includes an authentication server coupled to a data communication network. The authentication system also includes an authentication database associated with the authentication server. The authentication database is configured to store authentication information for comparison to login information provided by a user for authenticating the user. The authentication database is further configured to store user-specific information identifying the user with respect to one or more services provided by at least one affiliate server coupled to the data communication network. And the affiliate server is configured to provide the one or more services to the user via a client coupled to the data communication network. The authentication server is configured to receive a request from the user for a service to be provided by the affiliate server. The authentication server is further configured to authenticate the user responsive to the request when login information retrieved from the user via the data communication network matches the authentication information stored in the authentication database. And the authentication server is further configured to maintain a user profile storing the user-specific information, to receive a request from the requested service for user information associated with the user and consent to use the requested user information, to determine, in response to the request for consent, if the requested user information is stored in the user profile. The authentication server is configured to provide a user interface to collect the requested user information that is not stored in the user profile from the user, to receive the user information provided by the user via the user interface in response, and to allow access by the requested service to the received user information.

In yet another embodiment of the invention, computer-readable media employing aspects of the invention have computer-executable components for managing consent between a client and at least one network server. The client and the network server are coupled to a data communication network. And the network server provides a service to a user via the client. The computer-readable media include a profiling component for storing user-specific information associated with the user. The computer-readable media also include a consent component for receiving a request from the service provided by the network server for user information associated with the user and for consent to use the requested user information. The consent component is further configured to determine, in response to the request for consent, if the requested user information is stored in the profiling component. The computer-readable media further include a user interface component for collecting the requested user information that is not included in the profiling component from the user. The consent component is configured to receive the requested user information provided by the user via the user interface component and to allow access by the service to the received user information.

Computer-readable media having computer-executable instructions for performing methods of managing consent embody further aspects of the invention.

Alternatively, one embodiment of the invention may comprise various other methods and apparatuses.

Other features will be in part apparent and in part pointed out hereinafter.

BRIEF DESCRIPTION OF THE DRAWINGS

FIG. 4 is an exemplary flow diagram illustrating further aspects of process flow according to one embodiment of the invention.

FIG. 7A to 7G illustrate exemplary user interfaces for profile and consent accrual according to embodiments of the invention.

FIG. 9 is a block diagram illustrating an exemplary embodiment of a suitable computing system environment in which one embodiment of the invention may be implemented.

Corresponding reference characters indicate corresponding parts throughout the drawings.

DETAILED DESCRIPTION OF THE INVENTION

Figure 1:
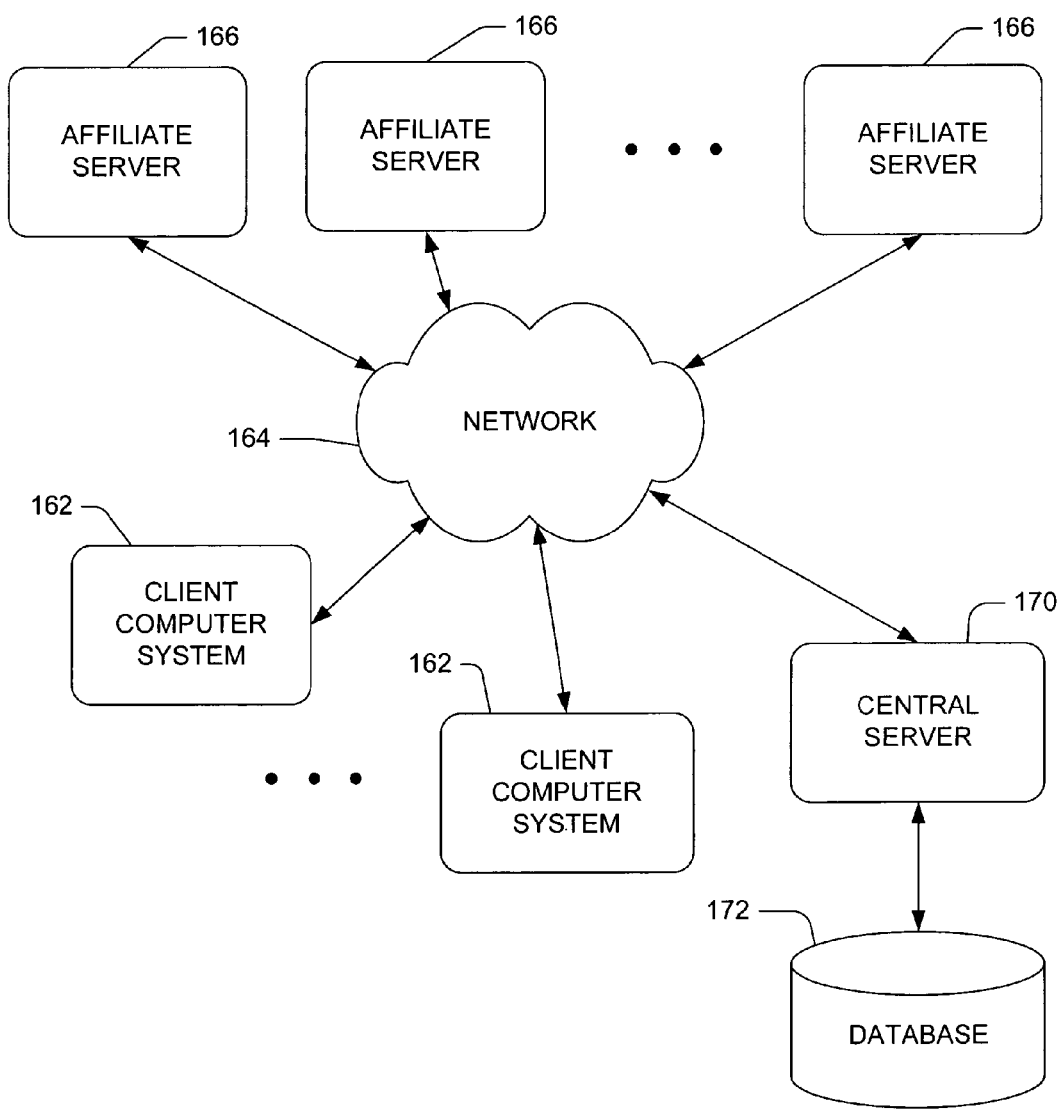
FIG. 1 is a block diagram illustrating an exemplary network environment in which one embodiment of the present invention may be utilized.

Referring now to the drawings, FIG. 1 illustrates an exemplary network environment in which embodiments of the present invention may be utilized for managing permissions and user profile information. Embodiments of the invention relate to cross-internet collaboration between web sites as part of, for example, a distributed, multi-site user authentication system. Such services provide a user with the ability to access one or more participating web sites or resources with a single sign-in. Although the participating sites (referred to herein as "affiliates" or "affiliate sites") maintain control over permissions, they use the authentication service rather than hosting and maintaining their own proprietary authentication systems. The related sites or services are referred to herein as a "service group" or "shared services group" because they represent a group of independent sites IDs that together provide a user with a set of services. Shared services groups, however, need not employ the same policies regarding permissions. As used herein, "policy group" or "consent group" refers to a predefined group of sites (or applications generally) that have a shared permissions set, that is, they share a common set of permission standards (e.g., a common privacy policy).

As a part of the single sign-in service, the user can choose to store information in a user profile. Typical user profile information (attributes) includes name, address, gender, occupation, preferred language, credit card information, billing address, shipping address, telephone numbers, and the like. At the user's option, the sign-in service makes all or part of the user profile information available to participating sites visited by the user. In one embodiment, the user is redirected from the sign-in service back to the desired affiliate site with an encrypted authentication ticket and profile information attached. This enables affiliate sites to customize and enhance user experience without having to prompt for information.

In FIG. 1, one or more client computer systems 162 are coupled to a data communication network 164. In this exemplary embodiment of the invention, the network 164 is the Internet (or the World Wide Web). But the teachings of the present invention can be applied to any data communication network. Multiple affiliate servers 166 are also coupled to network 164. The affiliate servers 166 may be referred to as "web servers" or "network servers" generally.

A central server 170 coupled to network 164 allows communication between itself, client computer systems 162, and web servers 166. In operation, one or more client computer systems 162 can access affiliate servers 166 via network 164. Although sometimes referred to as an "authentication server," "login server," or "profile server" in connection with FIG. 1, the central server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information.

The sites of affiliated servers 166 may exhibit the privacy statement of the hosting service, which indicates that they are under the auspices of the same policy and, thus, changes made to data usage will impact the sites. Nevertheless, a particular content provider's policy could be changed without affecting the policy of the related services.

FIG. 1 further illustrates a database 172 coupled to server 170. In one embodiment, the database 172 stores information (i.e., credentials) necessary to authenticate a registered user of one of the client computer systems 162 (as well as other users on the network). The database 172 also maintains a profile store for registered users and identifies which elements of the user profile information should be provided to a particular affiliate server 166 when the user accesses its service. In general, a credential is a means for generating an authenticated reference to a single account identifier. For example, an EASI (E-mail As Sign-In) sign-in name and password, a mobile phone number and PIN, and a biometric signature are credentials that can be associated with the same profile data. The sites/services of affiliated servers 166 may employ a common privacy statement of a hosting service or use entirely different policies.

Although database 172 is shown in FIG. 1 as a single storage unit separate from central server 170 for convenience, it is to be understood that in other embodiments of the invention, database 172 may be one or more memories located within or separate from server 170. In a federated environment, for example, a plurality of servers 170 may be used to provide authentication, shared services management, policy and permissions management, and the like.

The server 170, as described herein, may be part of an authentication system that authenticates a user of client computer 162 seeking access to a particular one of the affiliate servers 166. In this embodiment, server 170 first requests authenticating login information from the user, such as the user's login ID and password. If the user is successfully authenticated, the server 170 of FIG. 1 routes the user's client computer 162 to the appropriate affiliate server 166 for performing a desired service for the user.

In one embodiment, an "affiliate server" is a web server that has "registered" or otherwise established a relationship or affiliation with central server 170. A particular affiliate server 166 includes a code sequence (not shown) that allows the affiliate server to communicate with server 170 when a user (who is also registered with server 170) requests access to affiliate server 166. Additional details regarding an exemplary authentication process and the interaction between client computer 162, affiliate servers 166, and server 170 are provided below.

Before executing the authentication process, both the user of client computer system 162 and the operator(s) of affiliate servers 166 "register" with server 170. This registration is a one-time process that provides necessary information to the authentication system. According to one embodiment of the invention, this registration also provides the user with his or her first opportunity to grant consent for the sharing of certain personal information. The user of client computer system 162 registers with server 170 by providing information about the user and/or client computer system 162, such as, the user's name, mailing address, and e-mail address. As part of the user registration process, the user is assigned (or selects) a login ID, which is a common login ID, used to access an affiliate server (e.g., server 166). The login ID may also be referred to herein as a "username," "member name," or "login name."

Additionally, the user selects a password associated with the login ID that is used for authentication purposes. After registering and logging into server 170, the user can visit an affiliate server 166 (i.e., affiliate servers that are also registered with the same authentication server) without additional authentication and often without reentering user information that is already included in the associated user profile. One embodiment of the present invention sets forth identifying the user account, or profile, by a unique account identifier.

The central server 170 of FIG. 1, i.e., the authentication server in this embodiment, validates the username/password provided by the user. Server 170 handles the authentication response by comparing the login data to the entries in database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that the authentication server sends (e.g., encrypted) to affiliate servers 166 as the authentication credential when the user signs in. This unique identifier makes it possible for the sites to determine whether the user is the same person from one sign-in session to the next.

When the user later visits an affiliate server 166 after central server 170 assigns a unique identifier to his or her account, the affiliate server 166 may desire the user to submit certain user-specific information in order to allow the user access to its contents or services. In this embodiment of the invention, affiliate server 166 may first request the user-specific information from central server 170. After receiving the request from affiliate server 166, central server 170 may access database 172 to obtain a user profile associated with the user. If the user profile associated with the user already includes the user-specific information requested by affiliate server 166, central server 170 may communicate the requested user-specific information to affiliate server 166 without prompting the user to submit the information. On the other hand, if the requested user-specific information is not included in the user profile, central server 170 may provide a consent UI to the user via a browser of client computer system 162. This consent UI includes open fields for the user to enter the requested user-specific information. If the user enters and submits the requested user-specific information to central server 170 via the consent UI, then he or she is allowed access to the contents or services provided by affiliate server 166. In addition, central server 170 will allow affiliate server 170 access to the submitted user-specific information. Central server 170 will further update the user profile with the submitted user-specific information. As can be seen, this embodiment of the invention advantageously allows a service to incrementally accrue consent to use information associated with a user during the user's experience with the service.

A service requesting user-specific information may belong to one or more administrative groups. Generally, administrative groups support the scenarios in which a user who has authority over the authorization settings or permissions of one or more other users. Such groups include, for example, parents, managers, users who control multiple credentials, and domain space administrators. One of several administrative groups, a service group comprises site IDs representative of related sites on the network that work together to provide the user with a consistent set of services. Members of a service group, however, need not share the same privacy statement. When this is the case, the user typically consents to the sharing of user-provided data with a particular policy group represented within the service group. There should be a contractual arrangement providing the user with a known set of services.

One such situation is when a network of Internet services provides premium content through an affiliated site. Operational information that may be maintained by one site but accessible to both the one site and another related site indicates that the user has, for example, a premium content subscription. This information allows the user to move between content providers without having to re-authenticate or prove membership as a premium content subscriber. Further, multi-company corporations can be represented as a service group when they do not share a corporate privacy statement. This might be when a financial company owns both banks and insurance companies and it wants the user to be able to move between the different companies without having to re-authenticate or prove membership.

On the other hand, a policy group comprises sites/services that operate under a shared privacy or other permissions policy. The policy group, which is another form of administrative group, implements first time login consent scenarios. By grouping applications, such as particular web services, having the same privacy policy, an embodiment of the invention allows a user to grant consent to share information with members of the policy group the first time the user signs in to a member of the group. If a particular site does not share a privacy statement with another site, then its site ID can be considered a policy group of one.

In one embodiment, member policy groups do not need to be listed in a group store. During the consent process, the server 170 of FIG. 1 can look to determine whether the site ID for the affiliate site 166 requesting information is a member of a policy group. In general, the database 172 associated with server 170 stores the operational information described above as well as the site IDs for the various service group and policy group members. If there is no association, then the site ID is a single member policy group.

In the context of shared services management, the user profile includes information used to represent participating site/user-specific information (e.g., whether or not the user has premium services such as those provided through an Internet portal or online service). One method for enabling participating sites/services to share information about their users with members of the site/service group is for the authentication system to include these information "bits" in a profile cookie. For instance, a premium content bit for an Internet services network allows sites on the services network to know that the user has a paid subscription, without having to make additional server-to-server calls. This information may be built into the profile cookie regardless of the site at which the user signs in and is independent of consent settings.

Figure 2:
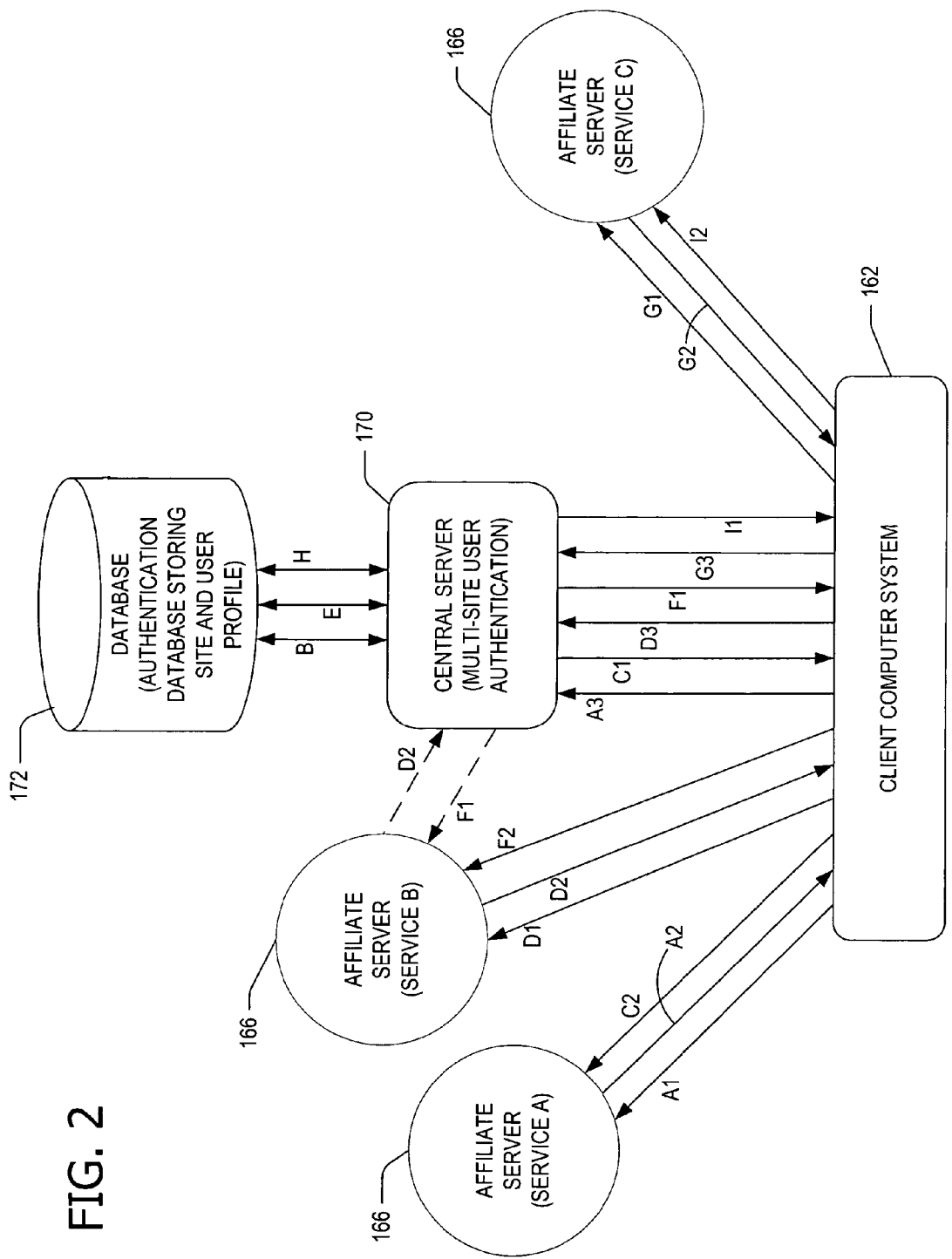
FIG. 2 is a diagram illustrating an exemplary interaction between client computer systems, affiliate servers, and central server of FIG. 1.

FIG. 2 is a diagram illustrating an exemplary implementation of one embodiment of the present invention and the interaction between server 170, multiple client computer systems 162, and at least one affiliate server 166. The illustrated example of FIG. 2 describes the situation in which the user of client computer system 162 has not yet logged into affiliate server 166 and has not yet been registered or authenticated by server 170. The lines in FIG. 2 labeled "A" through "I" represent the flow of information or activities during the process. The arrows on the lines indicate the direction of the process flow. In this example, the label "A" represents the beginning of the processes and the label "I" represents the end of the process.

In the exemplary process flow of FIG. 2, Service A and Service B form one shared services group. Service A and Service C form another service group. Service A and Service B also share a common privacy policy and, thus, are in a policy group together. The user, shown at client computer 162, navigates to a first selected service, namely, Service A (see A1). As an example, Service A represents an Internet portal service to which the user is signing in for the first time. Server 170 initiates sign-in and seeks first time consent from the user to disclose or use certain information in the user's profile (see A2/A3). The central server 170 also either stores the user's credentials for the first time or verifies the previously stored information (see B). Further, server 170 creates a ticket including: (a) user profile information that the user has agreed to share with Service A; (b) operational information specific to Service A; and (c) operational information that is shared between Service A and Service B (e.g., the user's status as a premium subscriber to Service B's content). If the shared services groups are established ahead of time, the user is signed in to Service A (see C1/C2) with both Service A specific and Service B and Service C shared operational information. In this instance, FIG. 2 further represents the user's first time consent to the privacy policy of Service A (see A2/A3).

When the user navigates to a content provider such as a Service B (see D1), server 170 silently authenticates the user (see D2/D3) inasmuch as the user is navigating within a shared services group. Moreover, Service A and Service B share a common privacy policy so that the user need not grant separate permission to Service B. In a similar manner, the server 170 as shown in FIG. 2 verifies the user (see E) and creates a ticket including: (a) user profile information that the user has agreed to share with Service B; (b) operational information specific to Service B; and (c) operational information that is shared between Service A and Service B. Central server 170 permits the user to sign in to Service B (see F1/F2) with both Service B specific and Service A shared operational information. But Service B does not have access to information in the client specific to Service A or shared by Service A and Service C. The user need not know that the system has routed him or her to another site because of the shared services and shared privacy policy arrangements.

In this exemplary process flow of FIG. 2, the user navigates to Service C (see G1) and is asked to re-authenticate (see G2/G3) because the immediately preceding site was in a different shared services group. As part of an authentication system, central server 170 verifies the user (see H) and creates a ticket including: (a) user profile information that the user has agreed to share with Service C; (b) operational information specific to Service C; and (c) operational information that is shared between Service A and Service C. The server 170 signs in the user to Service C (see I1/I2) with both Service C specific and Service A shared operational information. As above, Service C does not have access to information specific to Service A or shared by Service A and Service B. In the event this is the user's first visit to Service C, the user will again go through a first time consent process because Service C is not in the policy group with Services A and B. Even if Service C belonged to the same service group as Services A and B, the consent process would be necessary because Service C employs a different privacy policy in this example.

According to one exemplary embodiment of the invention, database 172 stores an extensible markup language (XML) file (hereinafter policygroup.xml) associated with a particular policy group. The policygroup.xml file includes information specific to the policy group and is utilized by central server 170 to perform authentication, shared services management, policy and permissions management, and the like. Table 1 provides descriptions of exemplary fields stored in the policygroup.xml file.

TABLE 1

Format of the Policygroup.xml File

| Field | Description |
| --- | --- |
| Friendly Name | A string representing the name of the policy group. |
| Group ID | A unique numeric identifier for the policy group. |
| Group Type | A numeric identifier that indicates the type of the policy group. |
| Group Owner | A numeric identifier for the owner of the policy group. This is the PUID of the user who is acting as the administrator for this policy group. |
| Privacy Policy Uniform Resource Locator (URL) | A pointer to the privacy policy for this policy group. |
| Privacy Policy Version Number | A version number of the privacy policy for this policy group. |
| Default Profile Attributes and Intentions | A list of profile attributes and intentions that are used during profile and consent accrual at a specific site in the policy group if the site has not specified a set of overriding profile attributes and intentions. |
| Retention | A description of how long sites in the policy group intend to use the accrued profile attributes. There is one retention per policy group. |
| Default Value Proposition | A sales pitch to get users to share information. This is used when a specific site has not specified an overriding value proposition. |
| Edit External Data URL | A pointer to a web page for users to edit site-specific attributes that are not stored in the user profile. |
| Account Removal URL | A pointer to a web page for users to remove site-specific attributes that are not stored in the user profile. |

In another exemplary embodiment of the invention, database 172 also stores an XML file (hereinafter site.xml) associated with a particular site of the policy group. According to this embodiment of the invention, the site.xml file includes information specific to the particular site and is also utilized by central server 170 to perform authentication, shared services management, policy and permissions management, and the like. Table 2 provides descriptions of exemplary fields stored in the site.xml file.

TABLE 2

Format of the Site.xml File

| Field | Description |
| --- | --- |
| Site Name | A string representing the name of the site. |
| Home Page URL | A pointer to the site homepage. |
| Profile Attributes and Site-Specific Attributes | A list of profile attributes and site-specific attributes desired by the site. The site can define additional site-specific attributes in addition to the core profile attributes defined by server 170. In the detailed description of the invention hereinafter, the term "attributes" may refer both to profile attributes and site-specific attributes. Server 170 defined profile attributes are specified by IDs, and site-specific attributes are specified by name strings. If profile attributes are specified in the site.xml file, they override the default profile attributes specified in the policygroup.xml file for the policy group of this site. There is also a "PolicyGroupDefaults" abstract attribute that allows sites to include the default profile attributes specified by the policygroup.xml file. |
| Value proposition | A sales pitch to get users to share information. If a value proposition is specified in the site.xml file, it overrides the default value proposition specified in the policygroup.xml file for the policy group of this site. |
| Intentions | A description of how the accrued profile attributes and site-specific attributes will be used by the site. If intentions are specified in the site.xml file, they override the default intentions specified in the policygroup.xml file for the policy group of this site. |
| Policy Group | A unique numeric identifier for the policy group to which the site belongs. |

In one embodiment of the invention, one policy group cannot be a member of another policy group. And sites can be in one policy group at a time. According to another embodiment of the invention, a site may move from one policy group to another. But if the user has previously granted consent for the original policy group to access the profile attributes stored in the user profile of the user, this consent remains with the original policy group. That is, the moved-away site can no longer access the profile attributes unless the user also grants consent for the new policy group to access the stored profile attributes.

As shown in Tables 1 and 2, the policygroup.xml file and the site.xml file may specify a list of profile attributes that are desired by a site when the user attempts to sign in to the site. According to an embodiment of the invention, if the site has specified the desired profile attributes in the layout section of its site.xml file, these profile attributes override the default profile attributes specified in the policygroup.xml file for the policy group to which the site belongs. Additionally, the site may specify an empty layout section in the site.xml file, which means that the site does not desire a profile attribute and that the site will not accrue information from the user.

And the site may include in its site.xml file a directive (the PolicyGroupDefaults abstract attribute) to specify the default profile attributes of the policygroup.xml file as its desired profile attributes. In such a scenario, a union of both sets of profile attributes is used for the site. That is, the site has specified that it desires both the profile attributes specified in the site.xml file and that specified in the policygroup.xml file.

Again, when the user attempts to access one of the services provided by one or more affiliate servers 166, he or she may first be directed to central server 170 for authentication. If the user does not have a credential stored in database 172, server 170 may desire the user to register with server 170 before allowing the user to access the service. That is, server 170 may host both the registration and authentication services (e.g., EASI). In one embodiment, the services hosted by server 170 also belong to a policy group, which may be the same policy group that one or more services of affiliate servers 166 belong to. As part of the registration process, in addition to the profile attributes desired by the service (which are specified in the site.xml of the service and/or in the policygroup.xml of the policy group to which the service belongs), server 172 may also mandate certain profile attributes from the user. The set of profile attributes desired by server 170 and the associated intentions and retentions are specified in an XML file (hereinafter namespace.xml) associated with server 170. As such, the list of profile attributes that the user needs to provide during registration is a union of profile attributes specified in the namespace.xml file and the site.xml file or that specified in the namespace.xml file and the policygroup.xml file if the overriding profile attributes are not specified in the site.xml file.

According to one embodiment of the invention, after the user completes the registration process by providing the desired profile attributes, one or more consent records are stored in database 172 indicating that the user has granted consent for the service (and the policy group to which it belongs to) and server 170 to use the provided profile attributes. Furthermore, server 170 creates and stores a user profile including the profile attributes provided by the user. According to another embodiment of the invention, a set of simple object access protocol (SOAP) application programming interfaces (APIs) may be utilized to manipulate the consent records and other consent settings programmatically. In this embodiment of the invention, a particular SOAP request is accompanied by a valid authentication ticket for the profile service. This ticket is in the SOAP message itself or in the HTTP headers. For security reasons (e.g., a client-side script from a hostile web site can fabricate SOAP requests and cause existing tickets to be automatically attached in the outgoing request headers), tickets arriving inside a cookie header are ignored.

APPENDIX A provides specific examples of the SOAP APIs and their corresponding signatures.

As discussed above, a set of intentions is associated with a particular profile attribute or site-specific attribute desired by the service. The intentions describe how a service intends to use the attributes provided by the user. In one embodiment of the invention, a particular intention is represented as a bit mask. Accordingly, the bit mask representation for the set of intentions associated with a particular attribute can be obtained by applying an OR operation to the individual bit mask representations of the intentions associated with the attribute. This bit mask representation for the set of intentions associated with the attribute can then be stored in a consent record.

In an alternative embodiment of the invention, an intention is stored in the site.xml, policygroup.xml and/or namespace.xml files as a numeric value instead of a string value. In order to prevent services provided by affiliate servers 166 from creating their own intentions, server 170 may define a string value for one or more numeric intention values. As such, the services are forced to adopt the intentions defined by server 170. Table 3 illustrates exemplary string values of the intentions and their corresponding numeric values.

TABLE 3

Exemplary Intention Values

| Numeric Value | String Value |
|---|---|
| 1 | Provide targeted content and advertising during your current visit. |
| 2 | Complete the task that you have asked us to do. |
| 3 | To help us maintain the site/service. |
| 4 | To help us evaluate and review our products, content or service. |
| 5 | To help us understand what our users such as you like to do when they use our site/service. |
| 6 | Provide targeted content and advertising based upon what we know about users such as yourself. |
| 7 | To help us understand what you, as an individual, like to do when you visit our site/service. |
| 8 | Provide targeted content and advertising based upon what we know about you and how you use our site or service. |
| 9 | To contact you in order to notify you of updates to the site or service. |
| 10 | To contact you in order to promote products or services. |
| 11 | Share information with third parties according to our privacy policy, which can be viewed at (URL). |
| 12 | For some purpose not covered by these statements. |

The user may grant consent for the service to use a particular attribute for a particular intention. When such consent is granted by the user, members of the policy group to which the service belongs may also use the attribute for this particular intention. As such, the consent record may indicate the following:
PolicyGroup=1
attribute=email, intentions=1, 3
attribute=gender, intentions=1

According to one embodiment of the invention, if the user signs in to different services in the same policy group, and if those services have different intentions for the same attribute, the user should re-grant consent for that attribute. For example, if the user grants consent to Service A in Policy Group 1 for gender and occupation with intention 2, and then signs in to Service B in Policy Group 1, which desires gender with intention 3, then the user is needed to grant consent to Service B for gender with intention 3. After the user grants such consent, the consent record would indicate the following:
PolicyGroup=1
attribute=gender, intentions=2, 3
attribute=occupation, intentions=2

It is noted that the actual attribute value is not stored in the consent record. Instead, the consent record stores the numeric identifier of the attribute.

In contrast to intentions, retentions specify the length of time that members of a policy group intend to keep information obtained from the user. In addition, unlike intentions, retentions apply to the entire policy group instead of individual members and apply to the entire set of attributes instead of individual attributes. But similar to intentions, retentions are stored in the site.xml, policygroup.xml, and/or namespace.xml files as numeric values instead of string values. And server 170 may define the string values for the numeric retention values to prevent services from creating their own retentions. Table 4 illustrates exemplary string values of the retentions and their corresponding numeric values.

TABLE 4

Exemplary Retention Values

| Numeric Value | String Value |
|---|---|
| 1 | Information is not retained beyond the current session. |
| 2 | Information is retained no longer than necessary to complete the user request. |
| 3 | Information is retained beyond task completion in order to be compliant with one or more legal requirements. |
| 4 | Information is retained according to the business practices of the site. The site does have a data destruction policy which can be viewed at (URL). |
| 5 | Information is retained for an indefinite period of time and may or may not be destroyed. |

There may be certain inherent dependencies between profile attributes. For example, the location profile attributes (country, zip, region, time zone) are inherently dependent on each other. Such dependencies may affect how services request these profile attributes and what are sent to the services. For example, server 170 may validate zip code based on the provided country and region information. Server 170 may also validate time zone based on the country information. So during profile and consent accrual, it may be desired that certain location profile attributes be provided in groups.

To ensure that the services understand these groups and to prevent server 170 from having to write validation codes that check for missing dependent profile attributes, group names may be defined for the services to represent these profile attribute groups. Table 5 shows exemplary dependencies between location profile attributes and exemplary group names for services to include in their site.xml files.

TABLE 5

Group Names for Interdependent Profile Attributes

| If service wants: | Then collect and send to service: | Group Name for site.xml |
|---|---|---|
| Postal Code | Region + Country + Postal Code | RegionCountryPostalcode |
| Region | Region + Country | RegionCountry |
| Time Zone | Country + Time Zone | CountryTimezone |

Figure 3A:
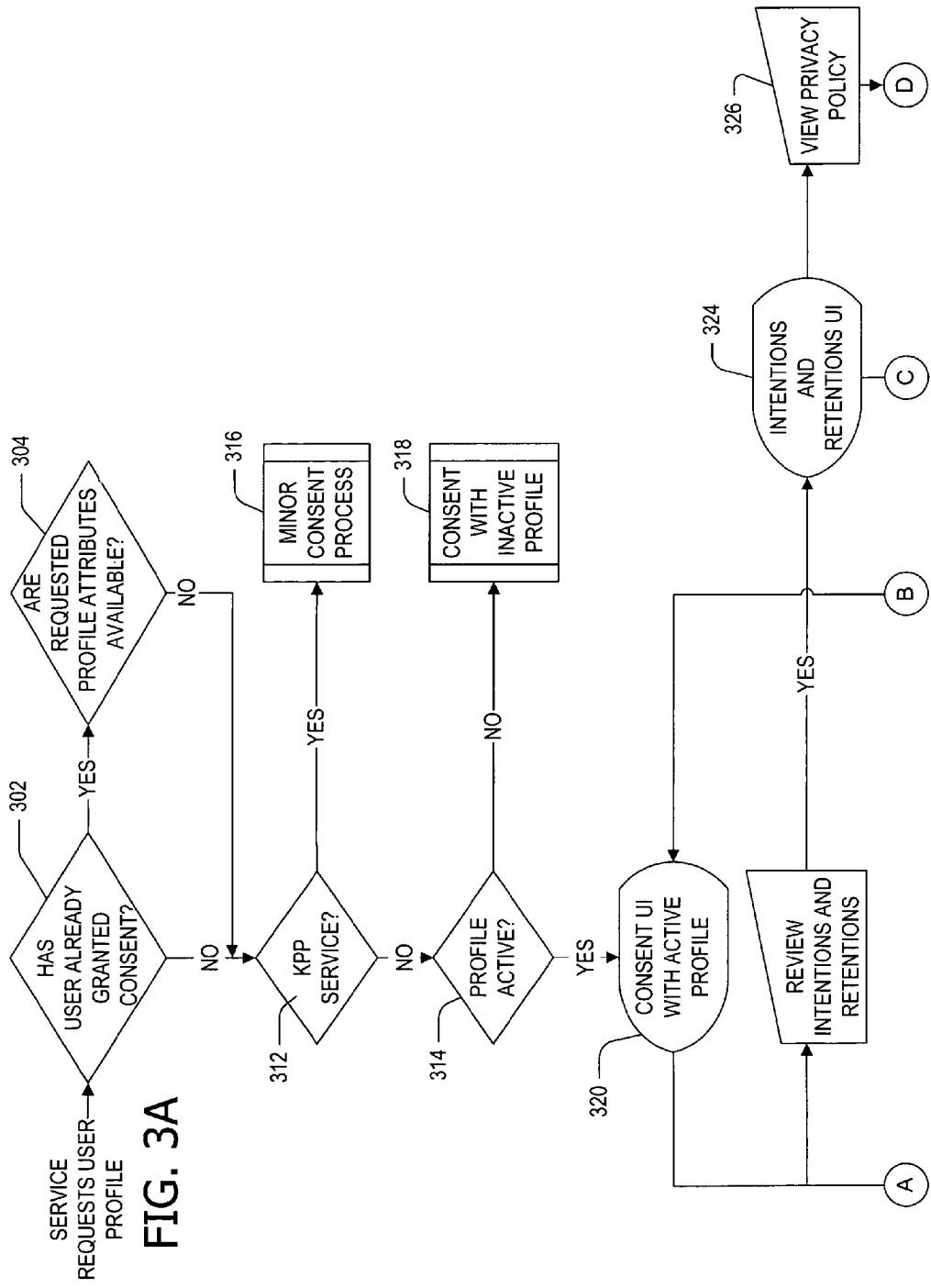
FIGS. 3A and 3B are exemplary flow diagrams illustrating process flow according to one embodiment of the invention.
Figure 3B:
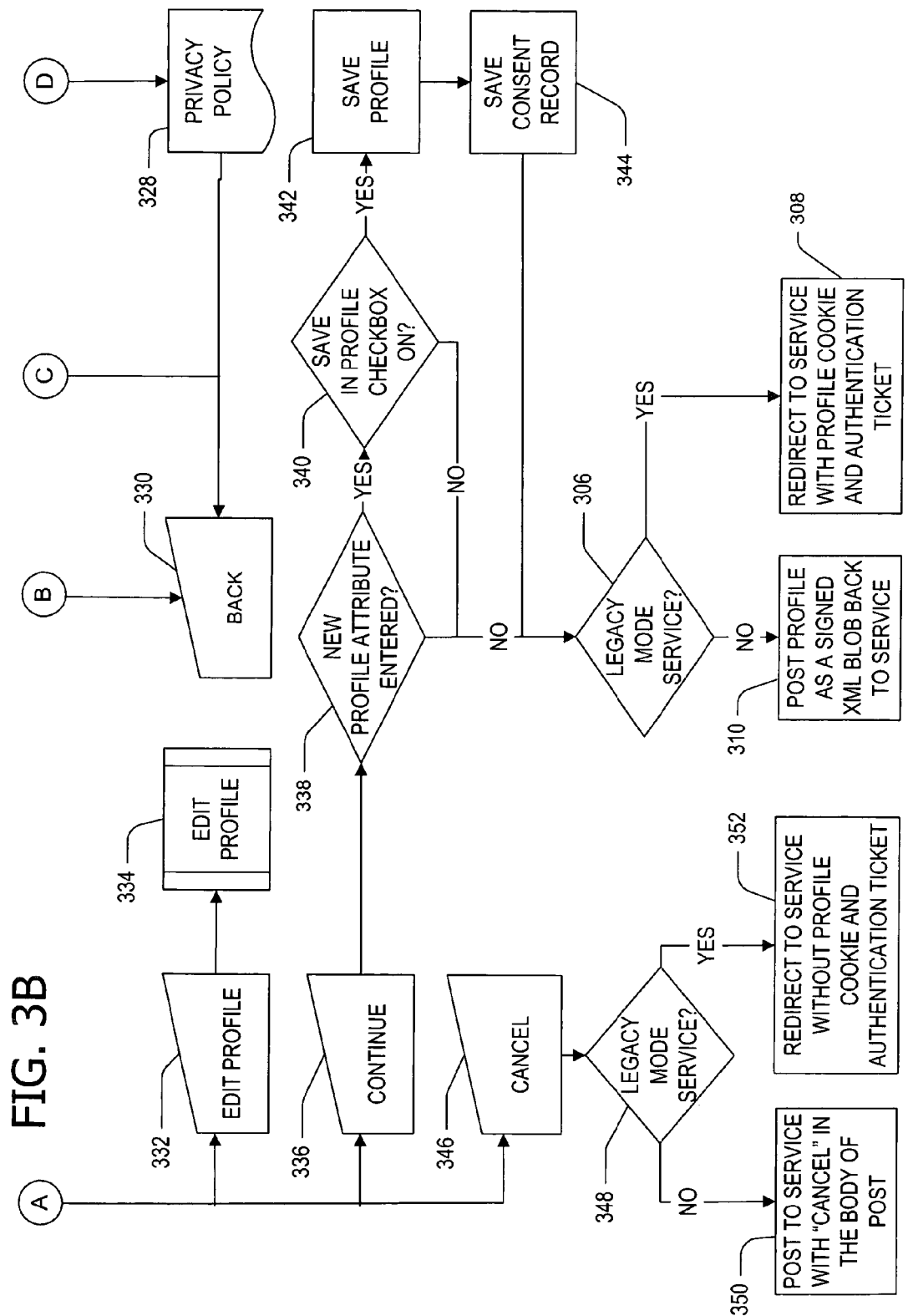

FIGS. 3A and 3B illustrate an exemplary operational flow for incrementally accruing user profile and consent according to one embodiment of the invention. FIGS. 3A and 3B involve a user who is visiting Service A hosted by one or more affiliate servers 166. Before the user is allowed access to Service A, Service A desires certain information regarding the user and thus requests a user profile of the user from central server 170 (e.g., via a SOAP API call). After the user is directed to server 170 and the login information (e.g., user email) is validated by server 170, server 170 at 302 determines if the user has already granted consent for Service A to use the profile attributes stored in the user profile. If the user has already granted consent to Service A, server 170 continues to 304 to determine if the requested profile attributes (i.e., the desired information) are in the user profile. If server 170 determines that the requested profile attributes are already in the user profile, then no profile and consent accrual is needed. In this case, server 170 may deliver the user profile to Service A.

Before server 170 delivers the user profile, it is determined at 306 if Service A is a legacy mode service. According to one embodiment of the invention, a legacy mode service does not allow the user to sign in to the service until he or she grants consent to the service. In contrast, a non-legacy mode service may allow the user to sign in and use its site without accruing the profile attributes stored in the user profile. In one embodiment of the invention, a flag called ProfileViaPOST embedded in the SOAP request is used to determine if Service A is in legacy mode or not. If this flag is set to a value of 1, Service A is not in legacy mode. As such, the user profile is delivered to Service A as a signed XML blob via HTTP POST over secure sockets layer (SSL). If ProfileViaPOST is not present or is set to a value of 0, Service A is in legacy mode. This means that the user profile is delivered to Service A as a profile cookie (e.g., a "p" parameter in the query string of the return URL of Service A). In addition, accompanying the profile cookie is an authentication ticket that authenticates the user for Service A. After the user profile is delivered to Service A, the user is redirected back to Service A from server 170.

According to one embodiment of the invention, the user profile delivered to Service A may include the entire profile attributes that the user has granted consent to the policy group to which Service A belongs. When multiple legacy mode services in the policy group shares an encryption key, these services should check the profile cookie to ensure that they are getting the desired profile attributes. If the correct attributes are not present, Service A may direct the user to server 170 to get the correct profile cookie. This might be necessary because the user may have previously signed in to another service in the policy group that desires fewer or different profile attributes. If this is the case, the profile cookie may be written with the profile attributes desired by the first service, which may be a subset of the profile attributes desired by Service A. When the user goes to Service A, the existing authentication ticket and profile cookie may automatically sign in the user to Service A. But since Service A desires different or more profile attributes than those present in the profile cookie, the user should be directed to Service A to create a new profile cookie with the proper profile attributes (i.e., the profile attributes desired by both services).

Figure 5:
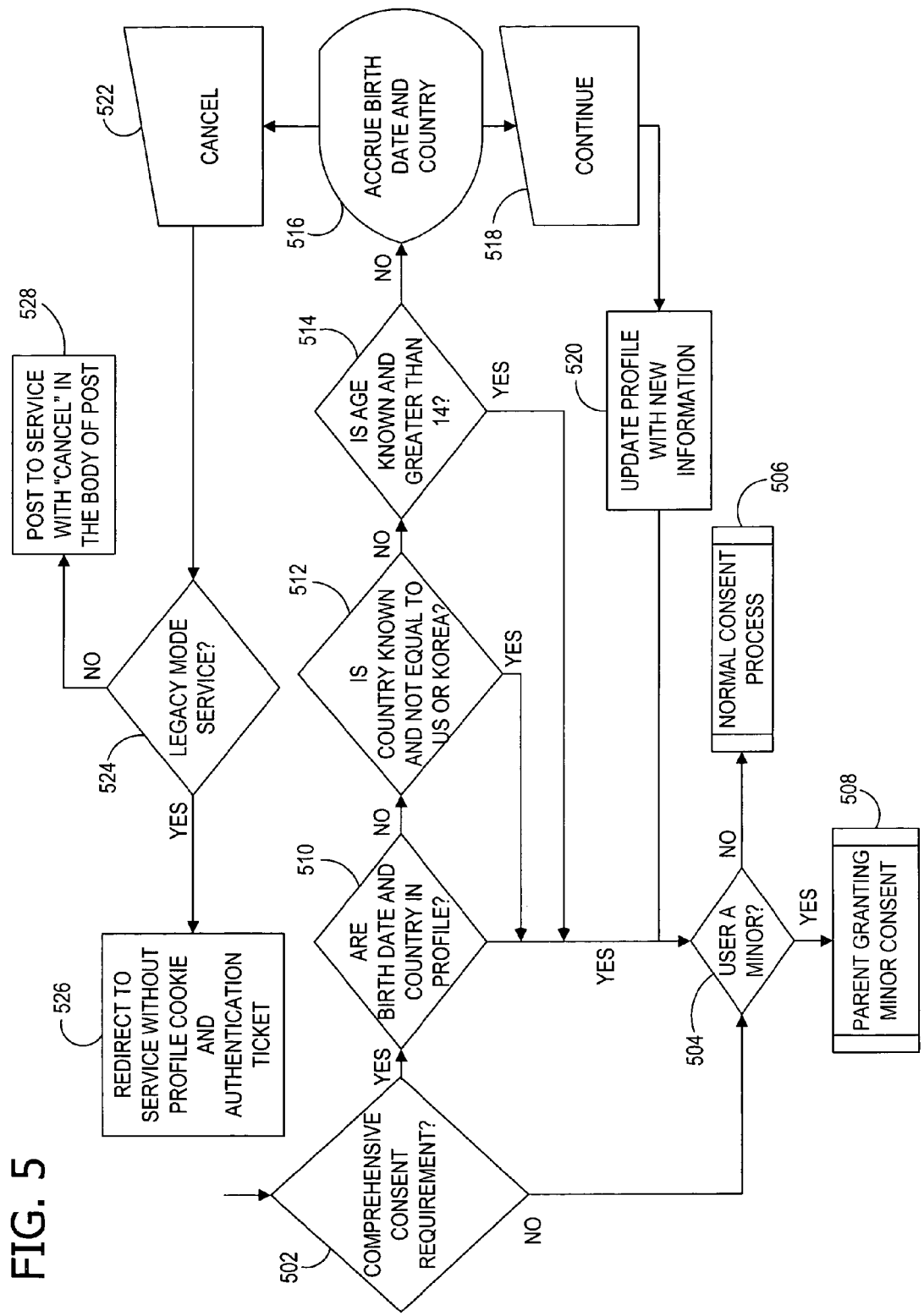
FIG. 5 is an exemplary flow diagram illustrating yet further aspects of process flow according to one embodiment of the invention.

Back to 302 and 304, if server 170 determines that the user has not already granted consent to Service A or that the requested profile attributes are not available in the user profile, server 170 proceeds to 312 to determine the value of Service A's KPP parameter read from the query string. In one embodiment of the invention, the KPP parameter specifies the parental consent requirements of children's privacy laws such as the Children's Online Privacy Protection Act (COPPA) and can have a range of values. In one embodiment of the invention, a KPP value of 0 indicates that Service A does not wish to comply with the children's privacy laws and thus is not a KPP service. In such a scenario, server 170 may proceed to 314. On the other hand, a non-zero KPP value indicates that Service A complies with the children's privacy laws (and thus a KPP service). In this case, server 170 may proceed to a minor consent process at 316, which is generally illustrated in FIG. 5.

At 314, server determines if the user profile of the user is active. According to one embodiment, the user may have made a decision on whether to have an active profile or an inactive profile during registration. An inactive profile means that profile attributes are not accrued from the user and that the user profile includes no profile attributes. In contrast, if the user has an active profile, profile attributes will be accrued and stored in the user profile depending on the consent granted by the user.

In one embodiment of the invention, if server 170 determines that the user profile is inactive, it continues to a consent process with inactive profile at 318, which is generally illustrated in FIG. 4. If the user profile is active, a consent UI with active profile is displayed to the user at 320. According to one embodiment of the invention, the consent UI is displayed to the user via a browser of one of the client computer systems 162 as a hypertext markup language (HTML) page. Included in the consent UI is a number of open fields for entry of profile attributes desired by Service A (and potentially additional profile attributes desired by the policy group to which Service A belongs). And profile attributes already stored in the user profile are displayed in the consent UI in non-editable form. According to one embodiment of the invention, Service A may specify in its site.xml file a list of site-specific attributes that it wishes to collect from the user. The site-specific attributes are specific to Service A and accordingly not stored in the user profile (instead, they may be stored in a database of Service A). If Service A has specified a list of site-specific attributes in its site.xml file, the consent UI may include open fields for entry of these site-specific attributes. These fields are displayed in the consent UI in a visually distinct way to inform the user that they are not part of the user profile.

Typically, the username that the user used to sign in to Service A may be the same as the alias of the user's email address stored in the user profile. And it is common for a service to allow the user to sign in using his or her email address. According to embodiments of the invention, if Service A specifies the user's email address or username as a desired profile attribute, and if the username is the same as the email alias, the consent UI may include a open field for the user to enter the email address instead of the username. In this embodiment of the invention, if the user submits his or her email address to server 170, Service A has been effectively granted consent to use the username of the user.

The consent UI may further provide a value proposition describing why the user should provide the requested attributes to Service A. As indicated at 322, a user-selectable option (e.g., an HTML link) allows the user to review intentions and retentions associated with the requested and previously stored profile attributes. Upon selection of the user-selectable option at 322, server 170 at 324 provides an intentions and retentions UI to the user. The intentions and retentions UI displays a list of requested and previously stored profile attributes and the corresponding intentions and retentions. The intentions and retentions for site-specific attributes desired by Service A and for the profile attributes desired by the policy group of Service A may also be displayed in the intentions and retentions UI. In one embodiment, attributes with the same intentions are grouped together in the intentions and retentions UI. And the intentions and retentions UI may display a list of services belonging to the policy group of Service A.

As an example, the intentions and retentions include a user-selectable option (e.g., an HTML link) for the user to view the privacy policy associated with the policy group to which Service A belongs, as indicated at 326. Upon selection of the user-selectable option at 326, server 170 at 328 may provide the privacy policy to the user (e.g., via a web page). As indicated at 330, if the user selects a "back" option displayed on the privacy policy page or in the intentions and retentions UI, he or she is directed back to the consent UI.

According to one embodiment of the invention, the consent UI also includes an "edit profile" option. Upon selection of the edit profile option at 332, the user is directed to an edit profile process at 334. At the beginning of the edit profile process, server 170 provides an edit profile UI (not shown) to the user. The edit profile UI includes a list of profile attributes currently stored in the user profile and provides open fields for the user to edit or update the currently stored profile attributes. After editing/updating the profile attributes and confirming the changes, a consent record is stored in database 172. The consent record indicates that Service A (and other members of the policy group of Service A) is granted consent to access the edited/updated profile attributes. Accordingly, Service A may request the same profile attributes without another consent UI in the future. The edited/updated profile attributes are further stored in the user profile. Accordingly, if the user selects an option to go back to the consent UI, the consent UI will now display the edited/updated profile attributes. In contrast, if the user goes back to the consent UI without confirming the changes, the consent UI will display the old profile attributes previously stored in the user profile. It is noted that if the user empties profile attributes in the edit profile UI and confirms the changes, the user profile then becomes inactive.

After entering the desired attributes in the open fields displayed in the consent UI, the user may select an option at 336 to continue the consent process. Upon selection of the option, server 170 determines at 338 if the user has entered new profile attributes. If the user has entered new profile attributes, server 170 further at 340 determines if the user has chosen to save the newly entered profile attributes by checking a checkbox displayed in the consent UI. If the user has chosen to save the newly entered profile attributes, server 170 proceeds to 342 to save the newly entered profile attributes in the user profile. Furthermore, server 170 at 344 stores a consent record in database 172 indicating that the user has granted consent for Service A to use the newly entered profile attributes. If the user has also granted consent for site-specific attributes, the consent record also indicates that Service A has been granted consent to use the site-specific attributes (and accordingly these site-specific attributes may not subsequently be accrued again). After the consent record is stored in database 172 (and if no new profile attribute is entered or if the user has not chosen to save the new profile attributes), server 170 proceeds to 306 to determine the mode of Service A. Server 170 then delivers the user profile to Service A as a function of the mode of Service A.

It is noted that in one embodiment of the invention, if the user grants consent to Service A, then he or she is effectively granting consent to the policy group to which Service A belongs. In other words, the member services of the policy group of Service A will be able to access the profile attributes stored in the user profile.

As indicated at 346, the consent UI further includes an option for the user to cancel the consent process. Upon selection of the option at 346, server 170 determines at 348 if Service A is a legacy mode service. If Service A is not a legacy mode service, server 170 at 350 delivers an HTTP POST to Service A with "cancel" in the body of the POST. If Service A is a legacy mode service, server 170 at 352 redirects the user back to Service A without an authentication ticket and profile cookie. Accordingly, if Service A is a legacy mode service, the user is not allowed to sign in to Service A. It is noted that according to one embodiment of the invention, even if the user cancels the consent process, prior existing consent to Service A may still remain (i.e., prior consent record is not removed). Accordingly, Service A may still be able to access profile attributes (and site-specific attributes) that Service A had previously been granted consent to use.

The consent UI may be provided to the user at subsequent visits to Service A under several scenarios. First, if Service A starts desiring a different set of attributes (including site-specific attributes) from those for which consent has already been granted, another consent UI may be provided to the user to accrue consent for the new set of attributes. Second, consent accrual may be needed again if Service A changes the intentions and retentions for attributes (including site-specific attributes) for which consent has already been granted, unless the user has granted consent for another service within the same policy group to use the attributes under the new intentions and retentions. For example, if the user has granted consent for Service A to use the user email for contact purpose, and subsequently Service A decides to use the email for advertising purpose, the consent UI will show up again when the user subsequently visits Service A in order to accrue consent for Service A to use the email for advertising purpose. Third, if the user deletes one or more of the profile attributes from the user profile to which he or she has already granted consent to Service A, the consent UI may be provided to the user during subsequent visits to Service A in order to accrue the deleted but desired profile attributes.

FIG. 4 illustrates an exemplary operational flow for consent accrual with an inactive profile according to one embodiment of the invention. After server 170 determines that the user profile of the user is an inactive profile (e.g., at 314 of FIG. 3A), server 170 may provide a consent UI with inactive profile to the user via a browser of one of client computer systems 162. The consent UI is similar to the consent UI of FIGS. 3A and 3B and includes an option for the user to review intentions and retentions associated with the desired and previously stored profile attributes (as well as site-specific attributes). Upon selection of the option at 404, server 170 may at 406 provide an intentions and retentions UI to the user. The intentions and retentions UI is also similar to the intentions and retentions UI illustrated in FIGS. 3A and 3B and displays intentions and retentions associated with the attributes as well as a list of services belonging to the policy group to which Service A belongs. The intentions and retentions UI also includes a user-selectable option for the user to view the privacy policy of the policy group of Service A. Upon selection of the option at 408, server 170 may at 410 provide the privacy policy to the user via a web page. As shown in FIG. 4, by selecting a "back" option at 412, the user may return to the consent UI from the privacy policy page or the intentions and retentions UI.

The consent UI includes a list of open fields for the user to enter the requested attributes and an option for the user to continue the consent process. Upon selecting the option to continue at 414, server 170 at 416 determines if the user has entered new profile attributes. If the user has entered new profile attributes, server 170 determines at 418 if the user has decided to enable/activate the user profile by checking an "enable profile" checkbox displayed in the consent UI. If the user has decided to enable/active the user profile, server 170 at 420 creates the user profile with the entered profile attributes and stores a consent record in database 172 indicating that Service A has been granted consent to use the newly entered profile attributes (as well as the newly entered site-specific attributes). After the user profile is created and the consent record is stored (or if no new profile attribute is entered or if the "enable profile" checkbox is not checked), server 170 determines at 422 if Service A is a legacy mode service. If Service A is a legacy mode service, server 170 at 424 redirects the user to Service A with a profile cookie and authentication ticket to allow the user to sign in to Service A. If Service A is not a legacy mode service, server 170 at 426 delivers the user profile to Service A as a signed XML blob via HTTP POST over SSL.

In one embodiment of the invention, the consent UI also includes an option for the user to cancel the consent process. If the option is selected by the user at 428, server 170 at 430 then determines if Service A is a legacy mode service. If Service A is a legacy mode service, server 170 at 432 redirects the user back to Service A without an authentication ticket and profile cookie. If Service A is not a legacy mode service, server 170 at 434 delivers an HTTP POST to Service A with "cancel" in the body of the POST. It is noted that the difference between the consent process with an active profile and the consent process with an inactive profile is that with an inactive profile, the user cannot edit stored profile attributes. This is because an inactive profile has empty fields (i.e., it does not store a profile attribute).

Referring now to FIG. 5, illustrated is an exemplary operational flow for the minor consent process according to one embodiment of the invention. In one embodiment of the invention, the consent process illustrated in FIG. 5 can be applied to a managed user account such as a parent or other responsible person granting consent for a minor. According to the embodiment of the invention, after server 170 determines that Service A is a KPP service at 312 of FIG. 3A, server 170 then at 502 determines if Service A complies with comprehensive parental consent requirements. This can be determined from the KPP parameter of Service A. For example, a KPP value of 3 may indicate that the service wishes to comply with the most restrictive parental consent requirements (e.g., as specified by COPPA). If Service A does not wish to comply with such comprehensive parental consent requirements, server 170 proceeds to 504 to determine if the user is a minor. If the user is not a minor, then server 170 at 506 proceeds to a normal consent process, which begins at 314 of FIG. 3A. If the user is a minor, then server 170 proceeds to a parent granting minor consent process at 508.

The parent granting minor consent process begins by providing a UI asking the user if the parent or other responsible person of the user is present with the user. If the user indicates that the parent (or other responsible person) is currently present with the user, server 170 renders a request for the parent to sign in to Service A on behalf of the user. When the parent signs in, server 170 operating in accordance with embodiments of the invention presents the parent with a consent UI for the minor, which displays a list of profile attributes stored in the user profile of the user as well as profile attributes entered by the user before the parent is rendered the consent UI. Further to the example, the parent reviews the consent UI and determines that he or she does not want Service A to have the user's real postal code. The parent selects an edit profile option and submits the request. The server 170 asks the parent to sign in again. After confirming that the parent is an adult (e.g., by confirming that the parent has a credit card), server 170 presents the parent with an edit profile UI displaying the user's stored profile attributes. The parent can change the postal code or other information for Service A and may save the changes to the user profile. After the changes are saved, the parent is directed back to the consent UI to finish granting or denying consent for the user. In one embodiment, the consent UI may display warnings that by using Service A, the user may enter additional personal information in public forums such as chat rooms, which may display the personal information to other users. If the parent still grants consent to Service A, server 170 directs the parent back to Service A where the user can sign in and access Service A.

Back to 502, if server 170 determines that Service A wishes to comply with the comprehensive parental consent requirements, it is determined at 510 if the birth date and country of the user are stored in the user profile. If the birth date and country of the user are not in the user profile, server 170 at 512 determines if the country of the user is known but not equal to US or Korea, which both have enacted children's privacy laws (e.g., COPPA of US and The Promotion of the Utilization of Information and Communication Network and Protection of Information Act of Korea). If this is not true, server 170 at 514 determines if the age of the user is known and greater than fourteen. If the age of the user is either not known or not greater than fourteen, then server 170 provides an accrual UI at 516 to accrue the birth date and country information from the user. Upon entry of the birth date and country information and selection of an option to continue the consent process at 518, server 170 proceeds to 520 to update the user profile with the new country and birth date information. After the user profile is updated, server 170 continues to 504 to determine if the user is a minor in order to decide which consent process (i.e., either the normal consent process or the parent granting minor consent process) is to be rendered to the user. Also illustrated in FIG. 5, server 170 also proceeds to 504 to determine the consent process to be rendered if (a) the birth date and country of the user are stored in the user profile; (b) the country of the user is known and not equal to US or Korea; or (c) the age of the user is known and greater than fourteen.

The accrual UI to accrue the birth date and country information also includes an option for the user to cancel the consent process. If this option is selected at 522, then server 170 at 524 determines if Service A is a legacy mode service. If Service A is a legacy mode service, server 170 at 526 redirects the user back to Service A without an authentication ticket and profile cookie. If Service A is not a legacy mode service, server 170 at 528 delivers an HTTP POST to Service A with "cancel" in the body of the POST.

Figure 6:
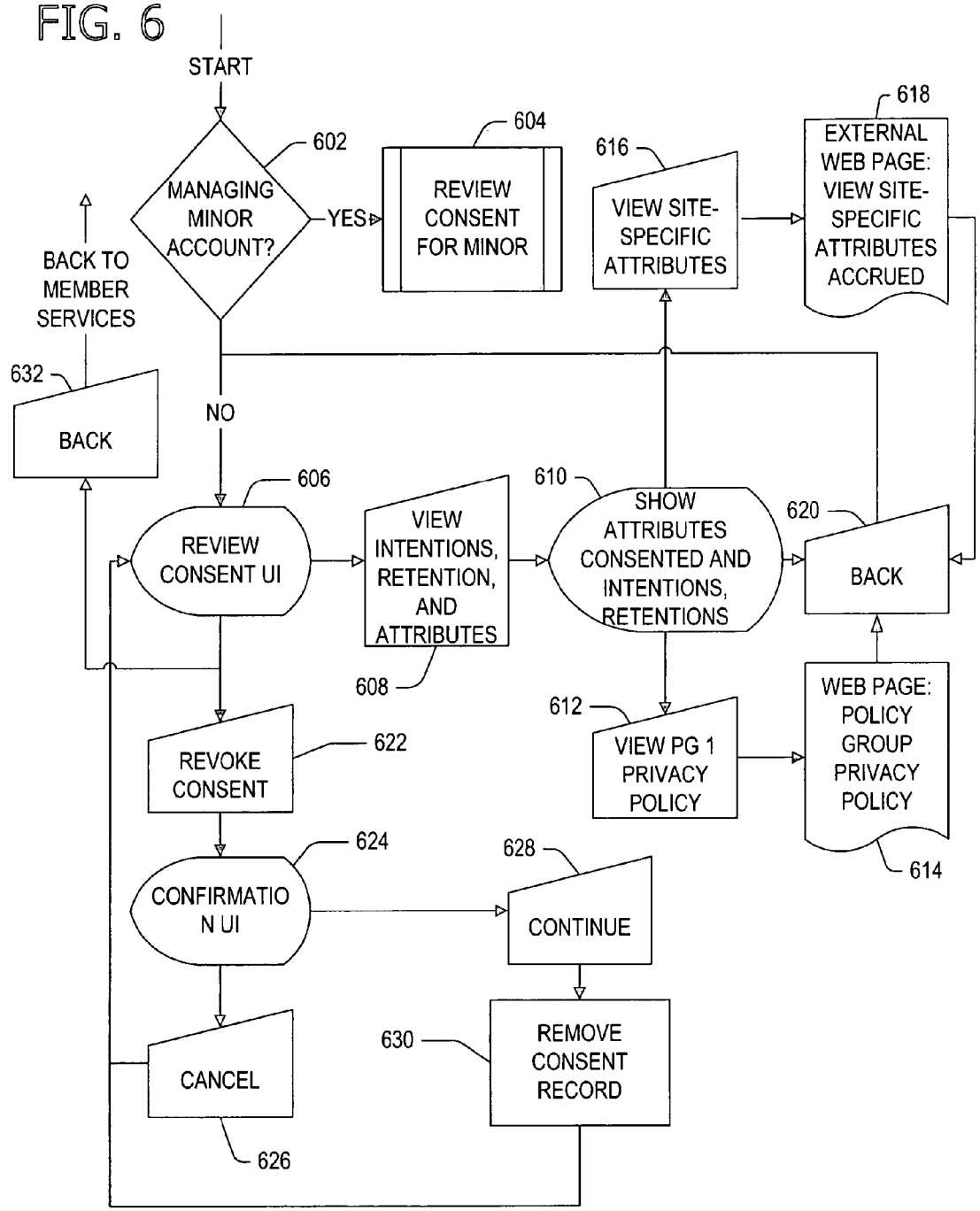
FIG. 6 is an exemplary flow diagram illustrating yet further aspects of process flow according to one embodiment of the invention.

FIG. 6 illustrates an exemplary operational flow for reviewing and/or revoking granted consent according to one embodiment of the invention. According to one embodiment of the invention, the user may access a member services page (e.g., a web page) hosted by server 170 allowing the user to review and/or revoke consent previously granted to a particular service or policy group. Upon access of the member services page, the user may at 602 indicate if the user intends to review and/or revoke consent for a managed minor user. If the user indicates that he or she wishes to review and/or revoke consent for the managed minor user, server 170 directs the user to a review consent for minor process at 604. This process allows the user to review the consent granted for or by the managed minor user and to revoke granted consent so that the managed minor user may not be able to access the revoked service.

If the user does not indicate that he or she wishes to review and/or revoke consent for a managed minor user, server 170 at 506 provides a review consent UI to the user via a browser. The review consent UI displays a list of policy groups and sites/services (including a link to the sites/services) to which the user has granted consent and includes an option for the user to view attributes consented (including site-specific attributes) for a particular policy group or site/service. Upon selection of the option at 608, the user at 610 is directed to an attributes UI that shows the attributes consented and the intentions and retentions associated therewith. The attributes UI has a user-selectable option for the user to view the privacy policy associated with the particular policy group. Upon selection of the option at 612, server 170 at 614 provides a web page displaying the privacy policy of the particular policy group. The web page includes an option to bring the user back to the review consent UI, as indicated at 620.

Since site-specific attributes are not stored in the user profile, the attributes UI does not display the values of such site-specific attributes. Nevertheless, the attributes UI includes an option for the user to view the values of the site-specific attributes accrued by a particular service. Upon selection of the option at 616, the user is provided a web page hosted by the particular service, which displays the values of the site-specific attributes previously accrued by the service. As shown in FIG. 6, both the attributes UI and the external web page hosted by the service may include a user-selectable option for the user to return to the review consent UI.

According to one embodiment of the invention, the review consent UI further has a revoke consent option for the user to revoke consent granted to a particular policy group or site/service. Upon selection of the option at 622, server 170 provides a confirmation UI at 624 to explain consequences of consent revocation (e.g., that the user can no longer access the service). The confirmation UI has an option 626 to cancel the option to revoke. Upon selection of the "cancel" option at 626, the user is directed back to the review consent UI. If the user selects a "continue" option at 628, server 170 at 630 may remove a consent record, which indicates that the particular service has been granted consent to access the profile attributes and site-specific attributes, from database 172. After the consent record is removed, the user is then directed back to the review consent UI, which includes a "back" option to bring the user back to the member services page, as indicated at 632.

According to one embodiment of the invention, revoking consent to a service also means revoking consent to members of the policy group to which the service belongs. So after consent is revoked, other members of the same policy group may no longer access profile attributes stored in the user profile. According to another embodiment of the invention, the user may not partially revoke consent. That is, the user may not revoke consent for a subset of the set of desired attributes while still allowing the service access to other desired attributes.

If the user wishes to continue accessing services provided by affiliate servers 166, he or she may not revoke consent for the profile attributes desired by server 170 as part of the registration process. These profile attributes are desired for the user to maintain his or her multi-site user authentication account with server 170. Accordingly, if these profile attributes are revoked, access to the services are not allowed unless the user re-registers with server 170 and provides the desired profile attributes. In another embodiment of the invention, if server 170 determines that the user is a minor, the option to revoke consent is not provided in the review consent UI. This embodiment of the invention prevents a minor user from revoking consent granted by a parent or other responsible person on behalf of the minor user.

APPENDIX B provides specific examples of the profile and consent accrual process.

FIG. 7A to 7G show exemplary user interfaces for accruing profile and consent in accordance with embodiments of the invention. As shown in FIG. 7A, the UI in this example has a number of form fields for accepting information from the user. The form fields for information that is editable during first time consent are empty and can be filled in by the user. Further, the UI of FIG. 7A, as part of a first time consent process, provides an indication to the user whether the information will be shared. In an alternative embodiment, such as illustrated in FIG. 7B, the UI presents the user with a link to an edit profile form. FIG. 7B shows a single link for selecting the edit profile option but it is to be understood that similar links could be provided in connection with particular information presented on the page (e.g., next to a particular field already including information). Selecting the option of editing the user profile navigates the user to, for example, a separate page presenting a UI for entering edits. FIG. 7C illustrates an exemplary UI that permits the user to enter edits in response to the user selecting the edit profile link. The user can then make desired additions or changes via the edit profile form.

FIG. 7D illustrates an exemplary UI that provides to the user intentions and retentions associated with the attributes desired by a service or previously stored in the user profile. Intentions describe how the service (and other members within the same policy group) will use the consented attributes. Retentions specify how long the service (and other members within the same policy group) intends to retain the consented attributes. The UI illustrated in FIG. 7D also includes a link to the privacy policy of the policy group to which the service belongs. FIG. 7E illustrates an exemplary UI for the user to review his or her consent. As shown in FIG. 7E, the UI includes a list of policy groups that the user has granted consent to. The UI also displays a list of sites/services belonging to a particular policy group. The user may select an option in the UI to review attributes shared with a particular policy group as well as to revoke consent for members of the policy group to access the attributes. FIG. 7F illustrates an exemplary UI provided to the user when the user selects the option to revoke consent. This UI displays the policy group and the member sites/services that the user intends to revoke consent as well as a list of attributes (and corresponding intentions) that are to be revoked. The UI also explains consequences of the consent revocation. The user may confirm the revocation by selecting the "revoke" button or cancel the revocation by selecting the "cancel" button in the UI. FIG. 7G illustrates an exemplary UI for obtaining the country and birth date information from the user. This UI is displayed to the user when the service is a KPP service and the country and birth date information are not stored in the user profile.

Figure 8:
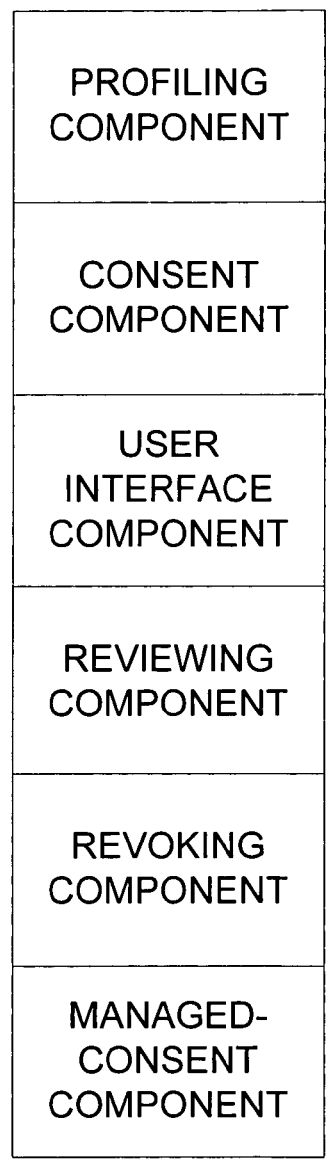
FIG. 8 is a block diagram illustrating an exemplary computer-readable medium according to one embodiment of the invention.

FIG. 8 is a block diagram illustrating an exemplary computer-readable medium according to one embodiment of the invention. As shown, this embodiment of the invention includes a profiling component, a consent component, a user interface component, a reviewing component, a revoking component, and a managed-consent component. The profiling component stores user-specific information associated with a user. The consent component receives a request from one or more services provided by affiliate servers 166 for consent to use user information associated with the user and determines if the user information is stored in the profiling component. The user interface component requests the user information from the user if the user information is not stored in the profiling component. The consent component is configured to receive the user information provided by the user via the user interface component and to allow access by affiliate servers 166 to the received user information. The reviewing component displays intentions and retentions associated with the user information requested by affiliate servers 166. The revoking component allows the user to revoke consent for the one or more services provided by affiliate servers 166 to use the user-specific information stored in the profiling component. The managed-consent component allows a responsible person (e.g., a parent) of the user to grant or revoke consent for the one or more services provided by affiliate servers 166 to use the received user information.

FIG. 9 shows one example of a general purpose computing device in the form of a computer 70. In one embodiment of the invention, a computer such as the computer 70 is suitable for use in client computer system 162, central server 170, or an affiliate server 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. The modulated data signal has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 9 illustrates operating system 84, application programs 86, other program modules 88, and program data 90.

The computer 70 may also include other removable/non-removable, volatile/nonvolatile computer storage media. For example, FIG. 9 illustrates a hard disk drive 94 that reads from or writes to non-removable, nonvolatile magnetic media. FIG. 9 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 9, provide storage of computer readable instructions, data structures, program modules and other data for the computer 70. In FIG. 9, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 9 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 9 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media contain instructions or programs for implementing the steps described herein in conjunction with a microprocessor or other data processor. Embodiments of the invention also include the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DOOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 70 executes computer-executable instructions such as those described herein to manage consent between a client and a network server. Computer-executable instructions maintain a user profile associated with a user of the client. Computer-executable instructions receive a request from a service provided by the network server for user information associated with the user and for consent to use the requested user information. Computer-executable instructions determine if the requested user information is included in the user profile in response to the request for consent. A user interface is provided to the user via a browser of the client to collect the requested user information that is not included in the user profile from the user. After receiving the user information provided by the user via the user interface, computer-executable instructions allow access by the service provided by the network server to the received user information.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

Appendix A

The following illustrates exemplary SOAP-based APIs used to manipulate consent settings.

EnumerateConsentRecords(UserID)

| Parameter | Type | Semantics |
|---|---|---|
| UserID | String | PUID or email address |
| RETURN VAL | Array of Integer | List of policy-group IDs of existing consent records for this user |

QueryConsentRecord(UserID, PolicyGroupID)

| Parameter | Type | Semantics |
|---|---|---|
| UserID | String | PUID or email address |
| PolicyGroupID | Integer | Numeric identifier for policy group |
| RETURN VAL | String (XML) | Blob encoding the consent records for that policy group. (Intentions and retention for a particular profile attribute collected) |

WriteConsentRecord(UserID, PolicyGroupID, NewRecord)

| Parameter | Type | Semantics |
|---|---|---|
| UserID | String | PUID or email address |
| PolicyGroupID | Integer | Numeric identifier for policy group |
| NewRecord | String (well-formed XML) | Blob encoding new consent record |
| RETURN VAL | Integer | Success or error-code |

GetPolicyGroupBySiteID(SiteID)

| Parameter | Type | Semantics |
|---|---|---|
| SiteID | Integer | Numeric identifier for the partner website |
| RETURN VAL | Integer | Policy ID |

EnumerateSites(PolicyGroupID)

| Parameter | Type | Semantics |
|---|---|---|
| PolicyGroupID | Integer | Numeric identifier for policy group |
| RETURN VAL | Array of Integer | Numeric IDs for relying sites that are included in the given policy group |

Appendix B

Granting Consent to Share Existing Profile Attributes

Ichiro has an EASI created at Website A. His profile includes his email address, country, state, and zip. Ichiro goes to Website B for the first time and presses the sign-in button. Website B desires users to provide country, state, and zip. After entering his username/password (if necessary) he is presented with a consent page. The consent page displays Ichiro's country, state, and zip, along with a summary of how Website B intends to use Ichiro's data. Ichiro agrees to consent by choosing the continue button. Website B gets Ichiro's country, state, and zip.

Site Asks for Same Profile Attributes

Ichiro has previously granted consent to Website B for country, state, and zip. He is currently logged into a website supporting a single sign-in service. He now goes to Website C for the first time. Website C desires the same profile attributes as Website B (country, state, and zip). He presses the sign-in button on Website C. He is automatically signed in to Website C, and Website C gets country, state, and zip. No consent UI is displayed because he had previously granted consent to Website B (for the same data, same intentions, and same retention), and because Website B and Website C are in the same policy group.

Site Asks for Different/More Profile Attributes

Ichiro is signed in to a website hosting a single sign-in service. He goes to Website D for the first time. Website D is in the same policy group to which Website B and Website C belong. Website D desires email address, country, state, and zip. Ichiro presses the sign-in button on Website D. Ichiro sees a consent page asking for consent for email address, country, state, and zip (because he has not yet granted consent to email address). He presses continue and is signed in to Website D, and Website D gets the email address, country, state, and zip.

Changing Profile Attributes During Consent

Ichiro moves from Redmond to Woodinville. Shortly after moving, he goes to Website E—a site he has never visited before. Website E wants email, country, state, and zip from its users. Ichiro presses the sign-In button and is presented with a consent page with email, country, state, and zip displayed in read-only mode. He sees that his zip is still the Redmond zip of 98052. He wants to change this to the Woodinville zip code, thus he clicks a link on the page that takes him to a page displaying his full user profile. Ichiro changes his zip code to 98072 and presses the "save" button. He is then taken back to the consent page and sees the updated zip code displayed in a read-only field. He presses continue, is signed in to Website E, and Website E gets his zip and email address.

Adding Missing Profile Attributes During Consent

Ichiro now goes to Website F, a site he has never been to before. Website F wants email, zip, country, gender, and birth date from its users. Ichiro presses the sign-in button and after entering his username/password (if necessary) he sees the consent page. The consent page displays email, zip, and country in read-only mode, and gender and birth date are shown. But since the gender and birth date profile attributes do not yet have values, they are shown as unspecified and are editable. Ichiro selects male for gender and enters his birth date directly on the consent page (he doesn't have to go to the edit profile page to do this). He presses continue, is signed in to Website F, and email, zip, country, gender, and birth date are sent to Website F. The new data he entered is also saved into his user profile, and a consent record is written to allow Website F to request the same information without UI in the future.

Canceling the Consent Process

Ichiro goes to Website G for the first time and presses the sign-in button. He sees the consent page. It includes birth date, and Ichiro does not want to provide that to Website G. So he clicks the cancel button on the consent page and is sent back to the return URL of Website G. No profile data is sent to Website G. If the site is operating in legacy mode, Ichiro is not signed in.

Site-Specific Profile Attributes

Joe purchases a mobile phone with Internet connectivity. Joe starts his browser on his phone to sign up for Website A. Due to the difficulty in typing on a phone, the registration process asks Joe to specify a username and password. No other profile information is desired. A week later, Joe goes to Website A on his personal computer for the first time and signs in. Immediately after signing in, Joe is presented with a consent/accrual page for the standard Website A profile attributes, including member directory and white pages checkboxes, which are site-specific attributes that are not stored in the user profile. Joe enters these and signs in to Website A. Joe then signs out. A week later, he goes to Website A on his personal computer and signs in. He gets in without another consent/accrual UI.

Material Change to Site's Privacy Policy

The policy group to which Website A belongs makes a material change to its privacy policy. It will now sell the user's profile information to third parties. Joe now goes to Website A, a site that he has used before. He is asked to consent to share his data again with the new intentions.

A Child Signs in to a KPP Site

Abby's son, Tanner, signs in to Website D for the first time to use his soccer team community site. Tanner has a user profile that includes his email address. Since Website D complies with the COPPA regulation, Tanner is shown a consent page that asks him to provide his birth date and country, as well as gender which Website D wants for targeted advertising. Tanner enters these values into the consent/accrual UI and presses continue. Since Tanner is a child and his parent has not yet provided consent to Website D, the next page he sees asks if his parent is with him to provide consent. He indicates "Yes" because his parent is present. Abby logs in, enters her credit card to prove she is an adult, reads the intentions, grants consent to Website D, and then sees the same profile consent/accrual page again with the data that Tanner entered in the initial profile consent/accrual page (except for site-specific attributes, the values of which are not stored in the user profile). This page also explains to Abby that Website D might allow Tanner to enter additional information in public forums such as chat rooms that may display the information to other users. Abby thinks this is fine and presses the continue button. She is logged out and redirected back to Website D where Tanner signs in and gets access to his soccer team community site.

A week later, Tanner signs in to Website H, which is not a KPP site. To access the site, Website H desires users to provide their occupation information. Instead of showing the normal profile consent page, the "Is your parent with you page" is shown. Abby is present. Accordingly, she presses "Yes" and signs in. She sees the profile consent page asking for occupation, selects "Student," and presses continue. She is signed out and redirected back to Website H where Tanner can now sign in. A week later, Tanner starts getting junk email at his email account. Abby believes this is caused by Tanner sharing his profile information with Website D, thus she goes to Member Services and denies consent to Website D.

Reviewing and Revoking Consent

Ichiro decides that he no longer wants Website E to have access to his profile data. So he goes to the Privacy section of Member Services and views a page showing the policy groups to which he has granted consent. Next to a particular policy group is a list of the attributes to which he has granted consent. He sees Website E, checks the box next to it, presses the "revoke" button, reviews the confirmation page explaining the consequences of revoking consent, and presses "continue" to complete the action.

Revoking Consent for a Child

Abby signs in to Member Services and chooses the Privacy section. From the Privacy section, she chooses the Managed Accounts link and reviews the consent settings for her children. When she discovers that she has granted full consent to Website E for Tanner, she revokes consent completely so that Tanner will not be able to sign in to Website E in the future.

What is claimed is:

1. A method of managing consent between a client and a network server, the client and the network server configured to be communicatively coupled to a data communication network, the network server configured to provide a service to a user via the client, and the client configured to operate a browser that is configured to permit the user to communicate on the data communication network, the method comprising:

maintaining a user profile associated with the user;

receiving a first request, the first request received from the service and requesting access to user information associated with the user;

determining whether the user profile indicates that the user has provided consent for the service to access the requested user information;

in response to the determining that the user profile does not indicate that the user has provided consent for the service to access the requested user information, providing to the user, via the browser, a consent user interface that includes a second request, the second request requesting that the user provide consent for the service to access the requested user information, the second request including information describing how the service intends to use the requested user information and a user-selectable option configured to allow the user to provide an indication that the user approves providing consent for the service to access the requested user information;

receiving, from the user and via the consent user interface, the indication that the user approves providing consent for the service to access the requested user information;

updating the user profile to include an indication that the user has provided consent for the service to access the requested user information; and allowing the service to access the requested user information in accordance with the indication of consent included in the updated user profile.

2. The method of claim 1, wherein the user profile comprises certain user information and the requested user information comprises a first portion of the certain user information, the method further comprising:

receiving a third request, the third request received from the service and requesting access to additional user information associated with the user, the requested additional user information comprising a second portion of the certain user information and the second portion being at least partially different than the first portion;

determining whether the user profile indicates that the user has provided consent for the service to access the requested additional user information;

in response to the determining that the user profile does not indicate that the user has provided consent for the service to access the requested additional user information, providing to the user, via the browser, a further consent user interface that includes a fourth request, the fourth request requesting that the user provide consent for the service to access the requested additional user information, the fourth request including information describing how the service intends to use the requested additional user information and a user-selectable option configured to allow the user to provide an indication that the user approves providing consent for the service to access the requested additional user information;

receiving, from the user and via the further consent user interface, the indication that the user approves providing consent for the service to access the requested additional user information;

further updating the user profile to include an indication that the user has provided consent for the service to access the requested additional user information; and allowing the service to access the requested additional user information in accordance with the indication of consent included in the further updated user profile.

3. The method of claim 2, wherein the service provided by the network server is a member of a policy group, and wherein the further consent user interface further displays a list of members of said policy group and further displays retention information associated with the requested user information, said retention information specifying how long the requested user information will be retained by the service provided by the network server.

4. The method of claim 2, wherein said further consent user interface further displays a second user-selectable option for viewing a privacy policy associated with said policy group, said privacy policy relating to how user information that the policy group is granted consent to use is to be protected, and further comprising providing a policy user interface via the browser for displaying the privacy policy, said policy user interface being provided in response to the second user-selectable option being selected by the user.

5. The method of claim 1, wherein the user profile is being maintained by a central server, said central server being coupled to the data communication network, and wherein the user interface is being provided by the central server and displays user information previously included in the user profile.

6. The method of claim 1, further comprising providing a revocation user interface via the browser for allowing the user to revoke consent for the service provided by the network server to use the user information included in the user profile, said revocation user interface displaying a list of services for which the user has granted consent to use the user information included in the user profile.

7. The method of claim 6, wherein said revocation user interface further displays a user-selectable option for revoking consent for the service provided by the network server to use the user information included in the user profile, and revoking consent in response to the user-selectable option being selected by the user.

8. The method of claim 1, further comprising providing an administrator user interface to a responsible person of the user in response to said receiving the indication from the user and via the further consent user interface, said administrator user interface allowing the responsible person of the user to grant consent for the service provided by the network server to use the requested additional user information and allowing access by the service to the received requested additional user information if consent for the service to use the received requested additional user information is granted by said responsible person and wherein said responsible person is a parent of the user.

9. One or more computer-readable storage media having computer-executable instructions for managing consent between a client and a network server, said client and said network server being coupled to a data communication network, said network server providing a service to a user via the client, said client operating a browser configured to permit the user to communicate on the data communication network, said computer-readable storage media comprising computer executable instructions for:

maintaining a user profile associated with the user;

receiving a first request, the first request received from the service and requesting access to user information associated with the user;

determining whether the user profile indicates that the user has provided consent for the service to access the requested user information;

providing, in response to the determining that the user profile does not indicate that the user has provided consent for the service to access the requested user information to the user, via the browser, a consent user interface that includes a second request, the second request requesting that the user provide consent for the service to access the requested user information, the second request including information describing how the service intends to use the requested user information and a user-selectable option configured to allow the user to provide an indication that the user approves providing consent for the service to access the requested user information;

receiving, from the user and via the consent user interface, the indication that the user approves providing consent for the service to access the requested user information;

updating the user profile to include an indication that the user has provided consent for the service to access the requested user information; and allowing the service to access the requested user information in accordance with the indication of consent included in the updated user profile.

10. The computer-readable storage media of claim 9, wherein the user interface is configured to display the user-specific information previously stored in a profiling component, and further comprising revoking instructions for allowing the user to revoke consent for the first service provided by the network server to use the user-specific information stored in the profiling component, said revoking instructions displaying a list of member services that the user has granted consent to use the user-specific information stored in the profiling component.

11. The computer-readable storage media of claim 10, wherein said revoking instructions further display a user-selectable option for allowing the user to revoke consent for the first service, and revoking consent in response to the user-selectable option being selected by the user.

12. The computer-readable storage media of claim 9, further comprising reviewing instructions configured to display retention information associated with the user information, said retention information specifying how long the user information will be retained by the first service provided by the network server.

13. The computer-readable storage media of claim 9, further comprising reviewing instructions configured to display a list of member services of a policy group.

14. The computer-readable storage media of claim 9, further comprising managed-consent instructions for providing the received indication to a responsible person of the user to allow the responsible person of the user to grant consent for the first service provided by the network server to use the received user information.

15. The computer-readable storage media of claim 9, wherein the user profile comprises certain user information and the requested user information comprises a first portion of the certain user information, the method further comprising:

receiving a third request, the third request received from the service and requesting access to additional user information associated with the user, the requested additional user information comprising a second portion of the certain user information and the second portion being at least partially different than the first portion;

determining whether the user profile indicates that the user has provided consent for the service to access the requested additional user information;

in response to the determining that the user profile does not indicate that the user has provided consent for the service to access the requested additional user information, providing to the user, via the browser, a further consent user interface that includes a fourth request, the fourth request requesting that the user provide consent for the service to access the requested additional user information, the fourth request including information describing how the service intends to use the requested additional user information and a user-selectable option configured to allow the user to provide an indication that the user approves providing consent for the service to access the requested additional user information;

receiving, from the user and via the further consent user interface, the indication that the user approves providing consent for the service to access the requested additional user information; further updating the user profile to include an indication that the user has provided consent for the service to access the requested additional user information; and allowing the service to access the requested additional user information in accordance with the indication of consent included in the further updated user profile.

16. The computer-readable storage media of claim 15, wherein the further consent user interface further displays a second user-selectable option for viewing a privacy policy, said privacy policy relating to how user information that the policy group is granted consent to use is to be protected, and further comprising providing a policy user interface via the browser for displaying the privacy policy, said policy user interface being provided in response to the second user-selectable option being selected by the user.

17. An authentication system comprising:

an authentication server including a processor and a memory configured to couple to a data communication network;

an authentication database associated with the authentication server, the authentication database stores user-specific information identifying the user with respect to one or more services provided by at least one affiliate server coupled to the data communication network, the affiliate server provides the one or more services to the user via a client coupled to the data communication network;

the authentication server executing instructions to:

maintain a user profile associated with the user;

receive a first request, the first request received from the service and requesting access to user information associated with the user;

determine whether the user profile indicates that the user has provided consent for the service to access the requested user information;

in response to the determination that the user profile does not indicate that the user has provided consent for the service to access the requested user information, providing to the user, via the browser, a consent user interface that includes a second request, the second request requesting that the user provide consent for the service to access the requested user information, the second request including information describing how the service intends to use the requested user information and a user-selectable option configured to allow the user to provide an indication that the user approves providing consent for the service to access the requested user information;

receive, from the user and via the consent user interface, the indication that the user approves providing consent for the service to access the requested user information;

update the user profile to include an indication that the user has provided consent for the service to access the requested user information; and allow the service to access the requested user information in accordance with the indication of consent included in the updated user profile.

18. The authentication system of claim 17, wherein the user profile maintained by the authentication server comprises certain user information and the requested user information comprises a first portion of the certain user information, the system further comprising the authentication server further executing instructions to:

receive a third request, the third request received from the service and requesting access to additional user information associated with the user, the requested additional user information comprising a second portion of the certain user information and the second portion being at least partially different than the first portion;

determine whether the user profile indicates that the user has provided consent for the service to access the requested additional user information;

in response to the determination that the user profile does not indicate that the user has provided consent for the service to access the requested additional user information, provide to the user, via the browser, a further consent user interface that includes a fourth request, the fourth request requesting that the user provide consent for the service to access the requested additional user information, the fourth request including information describing how the service intends to use the requested additional user information and a user-selectable option configured to allow the user to provide an indication that the user approves providing consent for the service to access the requested additional user information;

receive, from the user and via the further consent user interface, the indication that the user approves providing consent for the service to access the requested additional user information;

further updating the user profile to include an indication that the user has provided consent for the service to access the requested additional user information; and allow the service to access the requested additional user information in accordance with the indication of consent included in the further updated user profile.

19. The authentication system of claim 18, wherein the service provided by the authentication server is a member of a policy group, and wherein the further consent user interface further displays a list of members of said policy group and further displays retention information associated with the requested user information, said retention information specifying how long the requested user information will be retained by the service provided by the network server.

20. The authentication system of claim 18, wherein the further consent user interface further displays a second user-selectable option for viewing a privacy policy associated with said policy group, said privacy policy relating to how user information that the policy group is granted consent to use is to be protected, and further comprising providing a policy user interface via the browser for displaying the privacy policy, said policy user interface being provided in response to the second user-selectable option being selected by the user.

21. The authentication system of claim 18, further comprising providing a revocation user interface via the browser for allowing the user to revoke consent for the service provided by the authentication server to use the user information included in the user profile, said revocation user interface displaying a list of services for which the user has granted consent to use the user information included in the user profile.

22. The authentication system of claim 17, wherein the authentication server is further configured to provide a revocation user interface via the browser for allowing the user to revoke consent for the service provided by the network server to use the user information included in the user profile, the revocation user interface displaying a list of services for which the user has granted consent to use the user information included in the user profile.

23. The authentication system of claim 17, wherein the authentication server is further configured to provide an administrator user interface to a responsible person of the user in response to the receiving the user information provided by the user indication from the user and via the further consent user interface, the another administrator user interface allowing the responsible person of the user to grant consent for the service provided by the network server to use the received requested additional user information and wherein the responsible person is a parent of the user.

* * * * *